United States Patent
Tamagawa

(10) Patent No.: US 11,809,967 B2
(45) Date of Patent: Nov. 7, 2023

(54) INFORMATION PROCESSING APPARATUS AND METHOD OF CONTROLLING THE SAME

(71) Applicant: CANON KABUSHIKI KAISHA, Tokyo (JP)

(72) Inventor: Kei Tamagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 552 days.

(21) Appl. No.: 16/722,468

(22) Filed: Dec. 20, 2019

(65) Prior Publication Data
US 2020/0210898 A1    Jul. 2, 2020

(30) Foreign Application Priority Data
Dec. 26, 2018    (JP) .................. 2018-243787

(51) Int. Cl.
*G06N 20/00*    (2019.01)
*H04N 1/00*    (2006.01)
*G06F 17/18*    (2006.01)

(52) U.S. Cl.
CPC ............ *G06N 20/00* (2019.01); *G06F 17/18* (2013.01); *H04N 1/00068* (2013.01)

(58) Field of Classification Search
CPC .......................... G06N 10/00–90/00
See application file for complete search history.

(56) References Cited

U.S. PATENT DOCUMENTS

| | | | |
|---|---|---|---|
| 8,655,705 B2* | 2/2014 | Riepshoff | G06Q 10/087 705/348 |
| 2008/0313110 A1* | 12/2008 | Kreamer | G06Q 10/1097 706/14 |
| 2018/0075630 A1* | 3/2018 | Tanimoto | G06Q 30/0202 |
| 2019/0180358 A1* | 6/2019 | Nandan | G06F 18/2113 |
| 2021/0287155 A1* | 9/2021 | Kotake | A61B 5/165 |

FOREIGN PATENT DOCUMENTS

JP    2004-246628 A    9/2004

* cited by examiner

*Primary Examiner* — Arif Ullah
(74) *Attorney, Agent, or Firm* — Venable LLP

(57) ABSTRACT

An information processing apparatus comprises: an obtaining unit configured to obtain an estimation result estimated using an estimation model; a determination unit configured to determine a conversion table configured to correct the estimation result using the estimation model based on an estimation accuracy in the estimation model; and a correction unit configured to correct the estimation result based on the conversion table.

15 Claims, 27 Drawing Sheets

| FEATURE ID | TIME | x-COORDINATE OF POSITION | y-COORDINATE OF POSITION | ORIENTATION | ... |
|---|---|---|---|---|---|
| TR000001 | 2017/6/1 09:00:00 | 8.96 | 10.31 | 32.44 | ... |
| TR000002 | 2017/6/1 09:00:01 | 8.99 | 10.41 | 28.91 | ... |
| TR000003 | 2017/6/1 09:00:02 | 8.98 | 10.41 | 26.24 | ... |
| TR000004 | 2017/6/1 09:00:03 | 8.96 | 10.41 | 23.85 | ... |
| ... | ... | ... | ... | ... | ... |
| TR000721 | 2017/6/2 09:12:00 | 3.77 | 11.37 | 37.97 | ... |
| TR000722 | 2017/6/2 09:12:01 | 3.95 | 11.97 | 37.46 | ... |
| TR000723 | 2017/6/3 09:12:02 | 3.96 | 11.97 | 36.02 | ... |
| TR000724 | 2017/6/4 09:12:03 | 3.97 | 11.97 | 34.48 | ... |

| FEATURE ID | ACTUAL |
|---|---|
| TR000001 | PRINTING |
| TR000002 | PRINTING |
| TR000003 | PRINTING |
| TR000004 | PRINTING |
| ... | ... |
| TR000721 | INSPECTION |
| TR000722 | INSPECTION |
| TR000723 | INSPECTION |
| TR000724 | INSPECTION |
| ... | ... |

| FEATURE ID | ESTIMATION RESULT |
|---|---|
| TR000001 | PRINTING |
| TR000002 | PRINTING |
| TR000003 | PRINTING |
| TR000004 | PRINTING |
| ... | ... |
| TR000721 | INSPECTION |
| TR000722 | INSPECTION |
| TR000723 | INSPECTION |
| TR000724 | INSPECTION |
| ... | ... |

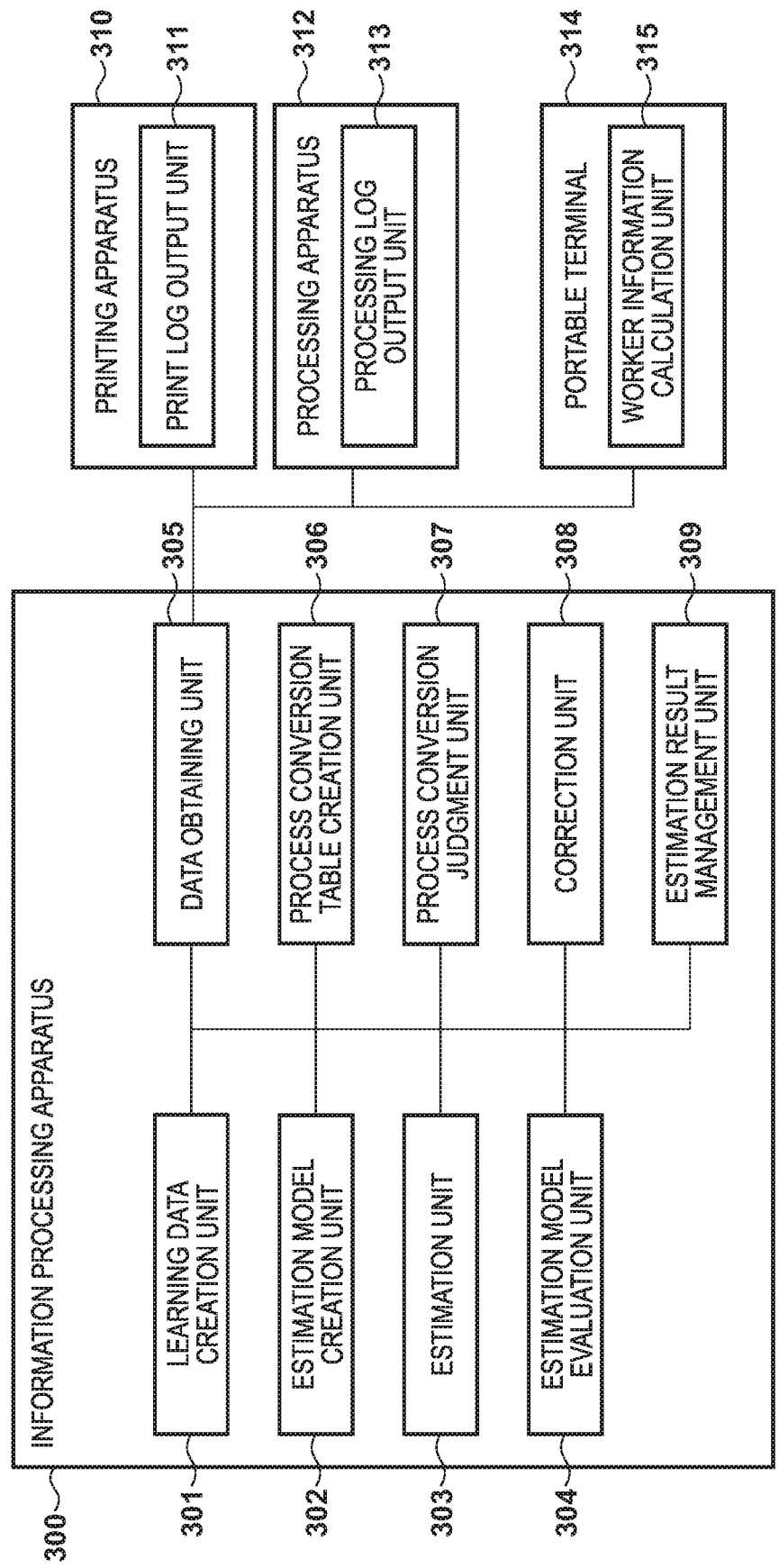

| ESTIMATION \ ACTUAL | ... | PRINTING | BOOKBINDING | CUTTING | ... |
|---|---|---|---|---|---|
| ... | ... | ... | ... | ... | ... |
| PRINTING | ... | 79 | ... | 20 | ... |
| BOOKBINDING | ... | ... | 70 | 30 | ... |
| CUTTING | ... | ... | ... | ... | ... |
| ... | ... | ... | ... | ... | ... |

| ACTUAL \ ESTIMATION | ... | PRINTING | BOOKBINDING | CUTTING | ... |
|---|---|---|---|---|---|
| ... | ... | ... | ... | ... | ... |
| PRINTING | ... | ... | ... | ... | ... |
| BOOKBINDING | ... | ... | ... | ... | ... |
| CUTTING | ... | 39 | 40 | 5 | ... |
| ... | ... | ... | ... | ... | ... |

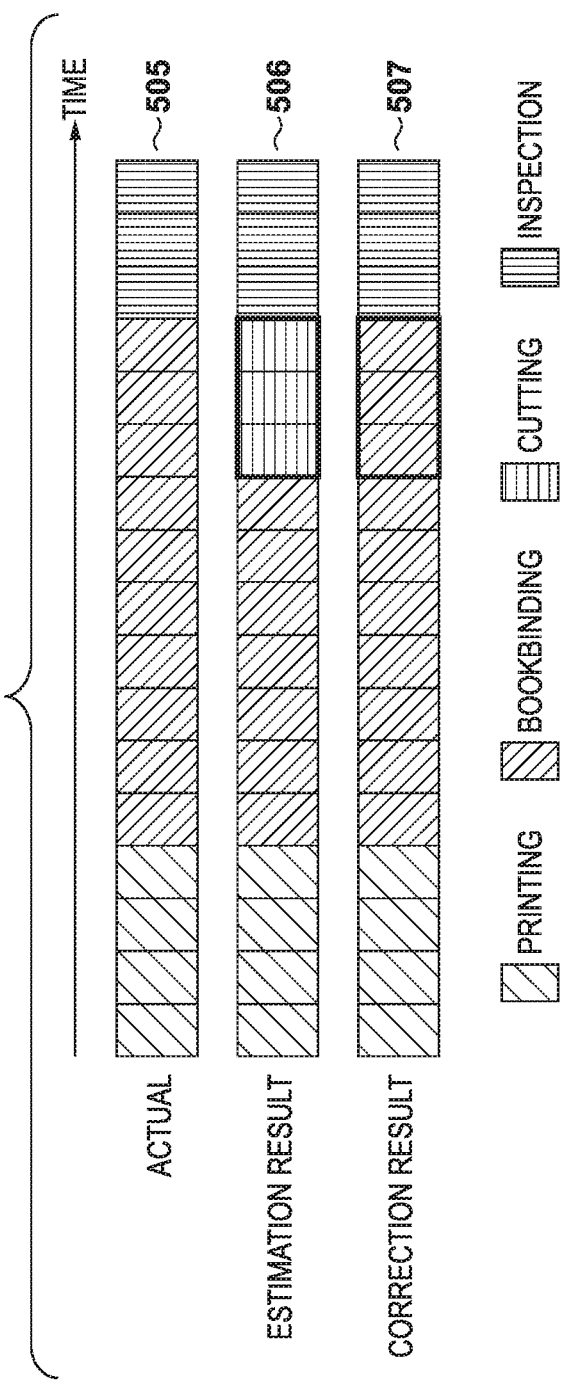

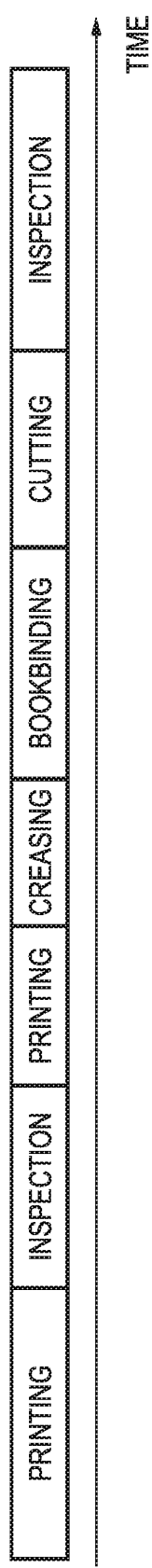

FIG. 9A (900)

| MERCHANDISE ID | MERCHANDISE NAME | PROCESS ID |
|---|---|---|
| S001 | LEAFLET | OP001 |
| S002 | PAMPHLET | OP101 |
| ... | ... | ... |

FIG. 9B (901)

| PROCESS ID | PROCESS NAME | RESOURCE ID | NEXT PROCESS ID | UNIT WORK TIME |
|---|---|---|---|---|
| OP001 | PRINTING | R001 | OP002 | 1 |
| OP002 | INSPECTION | R101 | — | 10 |
| OP101 | PRINTING | R002 | OP102 | 0.8 |
| OP102 | INSPECTION | R102 | — | 15 |
| ... | ... | ... | ... | ... |

FIG. 9C (902)

| RESOURCE ID | RESOURCE NAME |
|---|---|
| R001 | PRINTER-1 |
| R002 | PRINTER-2 |
| ... | ... |

FIG. 9D (903)

| ORDER ITEM ID | MERCHANDISE ID | ORDER QUANTITY | PAGE COUNT | MANUFACTURE TERM | ORDER RECEPTION DATE/TIME |
|---|---|---|---|---|---|
| OI001 | S001 | 1000 | 1 | 2017/6/2 16:00 | 2017/5/27 10:00 |
| ... | ... | ... | ... | ... | ... |
| OI100 | S001 | 1500 | 1 | 2017/6/2 16:00 | 2017/5/27 10:00 |

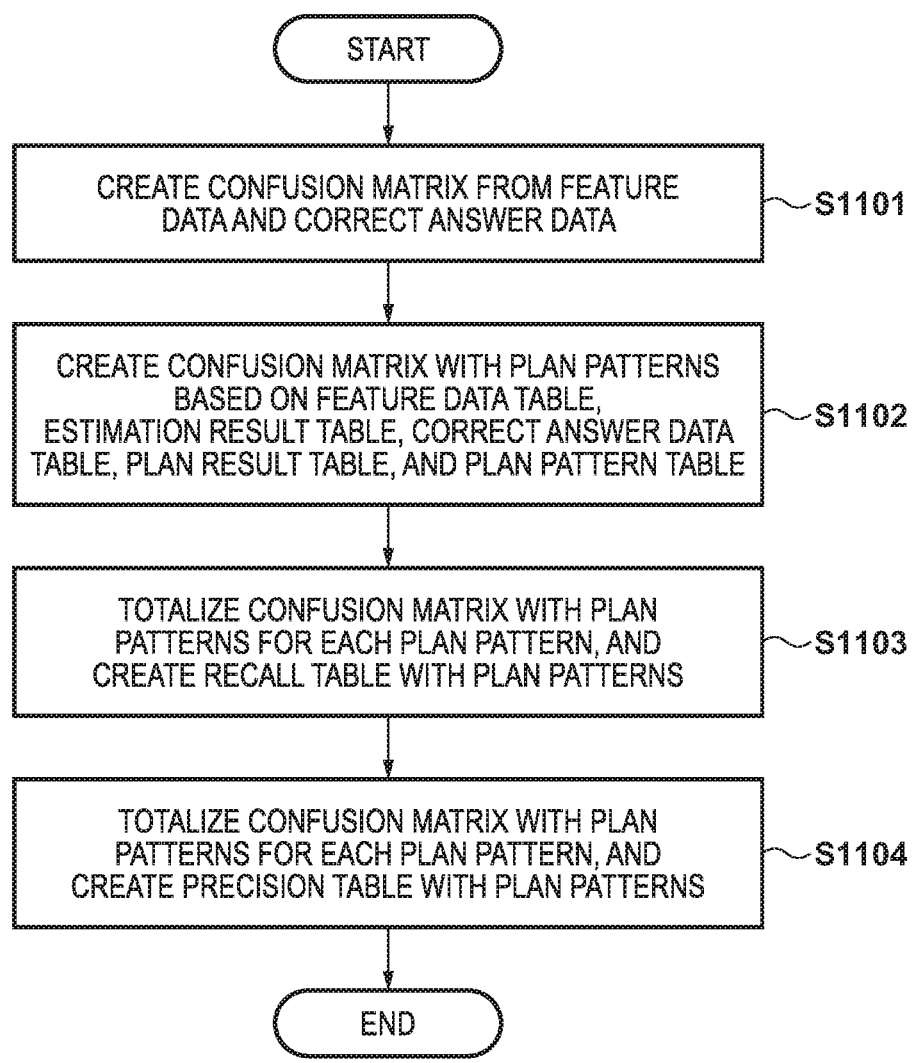

| PLAN RESULT ID | RESOURCE ID | PROCESS ID | PROCESS NAME | START TIME | END TIME |
|---|---|---|---|---|---|
| 1 | R101 | OP001 | PRINTING | 2017/6/1 9:00 | 2017/6/1 9:12 |
| 2 | R101 | OP002 | INSPECTION | 2017/6/1 9:12 | 2017/6/1 9:26 |
| ... | ... | ... | ... | ... | ... |

| ACTUAL \ ESTIMATION | | PRINTING | | | BOOKBINDING | | | |
|---|---|---|---|---|---|---|---|---|
| | | 0 | 1 | 2 | 0 | 1 | 2 | ... |
| PRINTING | | XXX | XXX | XXX | XXX | XXX | XXX | ... |
| ... | | ... | ... | ... | ... | ... | ... | ... |
| BOOKBINDING | | XXX | XXX | XXX | XXX | XXX | XXX | ... |
| ... | | ... | ... | ... | ... | ... | ... | ... |

| ACTUAL | ESTIMATION | ... | PRINTING | BOOKBINDING | ... |
|---|---|---|---|---|---|
| | ... | ... | ... | ... | ... |
| PRINTING | 0 | ... | XXX | XXX | ... |
| | 1 | ... | XXX | XXX | ... |
| | 2 | ... | XXX | XXX | ... |
| BOOKBINDING | 0 | ... | XXX | XXX | ... |
| | 1 | ... | XXX | XXX | ... |
| | 2 | ... | XXX | XXX | ... |
| ... | ... | ... | ... | ... | ... |

| ESTIMATION | ACTUAL | ... | PRINTING | BOOKBINDING | ... |
|---|---|---|---|---|---|
| | ... | ... | ... | ... | ... |
| PRINTING | 0 | ... | XXX | XXX | ... |
| | 1 | ... | XXX | XXX | ... |
| | 2 | ... | XXX | XXX | ... |
| BOOKBINDING | 0 | ... | XXX | XXX | ... |
| | 1 | ... | XXX | XXX | ... |
| | 2 | ... | XXX | XXX | ... |
| ... | ... | ... | ... | ... | ... |

| PROCESS CONVERSION ID | CONVERSION SOURCE | PLAN PATTERN | CONVERSION DESTINATION |
|---|---|---|---|
| 1 | CUTTING | 1 | BOOKBINDING |
| 2 | CUTTING | 2 | MOVING |
| 3 | CREASING | 3 | MOVING |
| ... | ... | ... | ... |

F I G. 16A

| ACTUAL \ ESTIMATION | | PRINTING | BOOKBINDING | CUTTING | CREASING | INSPECTION |
|---|---|---|---|---|---|---|
| PRINTING | 0 | XXX | XXX | XXX | XXX | XXX |
|  | 1 | XXX | XXX | XXX | 39.7 | XXX |
|  | 2 | XXX | XXX | XXX | XXX | XXX |
| BOOKBINDING | 0 | XXX | XXX | XXX | XXX | XXX |
|  | 1 | XXX | XXX | XXX | XXX | XXX |
|  | 2 | XXX | XXX | XXX | XXX | XXX |
| CUTTING | 0 | XXX | XXX | XXX | XXX | XXX |
|  | 1 | XXX | XXX | XXX | XXX | XXX |
|  | 2 | XXX | XXX | XXX | XXX | XXX |
| CREASING | 0 | XXX | XXX | XXX | XXX | XXX |
|  | 1 | XXX | XXX | XXX | XXX | XXX |
|  | 2 | XXX | XXX | XXX | XXX | XXX |
| INSPECTION | 0 | XXX | XXX | XXX | XXX | XXX |
|  | 1 | XXX | XXX | XXX | XXX | XXX |
|  | 2 | XXX | XXX | XXX | XXX | XXX |

| ESTIMATION \ ACTUAL | | PRINTING | BOOKBINDING | CUTTING | CREASING | INSPECTION |
|---|---|---|---|---|---|---|
| PRINTING | 0 | xxx | xxx | xxx | xxx | xxx |
|  | 1 | xxx | xxx | xxx | xxx | xxx |
|  | 2 | xxx | xxx | xxx | xxx | xxx |
| BOOKBINDING | 0 | xxx | xxx | xxx | xxx | xxx |
|  | 1 | xxx | xxx | xxx | xxx | xxx |
|  | 2 | xxx | xxx | xxx | xxx | xxx |
| CUTTING | 0 | xxx | xxx | xxx | xxx | xxx |
|  | 1 | xxx | xxx | xxx | xxx | xxx |
|  | 2 | xxx | xxx | xxx | xxx | xxx |
| CREASING | 0 | xxx | xxx | xxx | xxx | xxx |
|  | 1 | 44.6 | xxx | xxx | 0.4 | xxx |
|  | 2 | xxx | xxx | xxx | 90.0 | xxx |
| INSPECTION | 0 | xxx | xxx | xxx | xxx | xxx |
|  | 1 | xxx | xxx | xxx | xxx | xxx |
|  | 2 | xxx | xxx | xxx | xxx | xxx |

FIG. 19A 1900

| PROCESS ID | PROCESS NAME | RESOURCE ID | NEXT PROCESS ID | UNIT WORK TIME | VARIANCE |
|---|---|---|---|---|---|
| ... | ... | ... | ... | ... | ... |
| OP003 | CUTTING | R003 | OP004 | 40 | 16.0 |
| OP004 | BOOKBINDING | R004 | OP005 | 1 | 0.1 |
| OP005 | INSPECTION | R005 | — | 40 | 5.0 |
| ... | ... | ... | ... | ... | ... |

FIG. 19B 1901

| ACTUAL / ESTIMATION | | PRINTING | BOOKBINDING | CUTTING | ... |
|---|---|---|---|---|---|
| ... | | ... | ... | ... | ... |
| PRINTING | | ... | ... | ... | ... |
| BOOKBINDING | | ... | 30 | ... | ... |
| CUTTING | | ... | 70 | ... | ... |
| ... | | ... | ... | ... | ... |

FIG. 19C 1902

| ESTIMATION / ACTUAL | | PRINTING | BOOKBINDING | CUTTING | ... |
|---|---|---|---|---|---|
| ... | | ... | ... | ... | ... |
| PRINTING | | ... | ... | ... | ... |
| BOOKBINDING | | ... | 99 | ... | ... |
| CUTTING | | ... | ... | ... | ... |
| ... | | ... | ... | ... | ... |

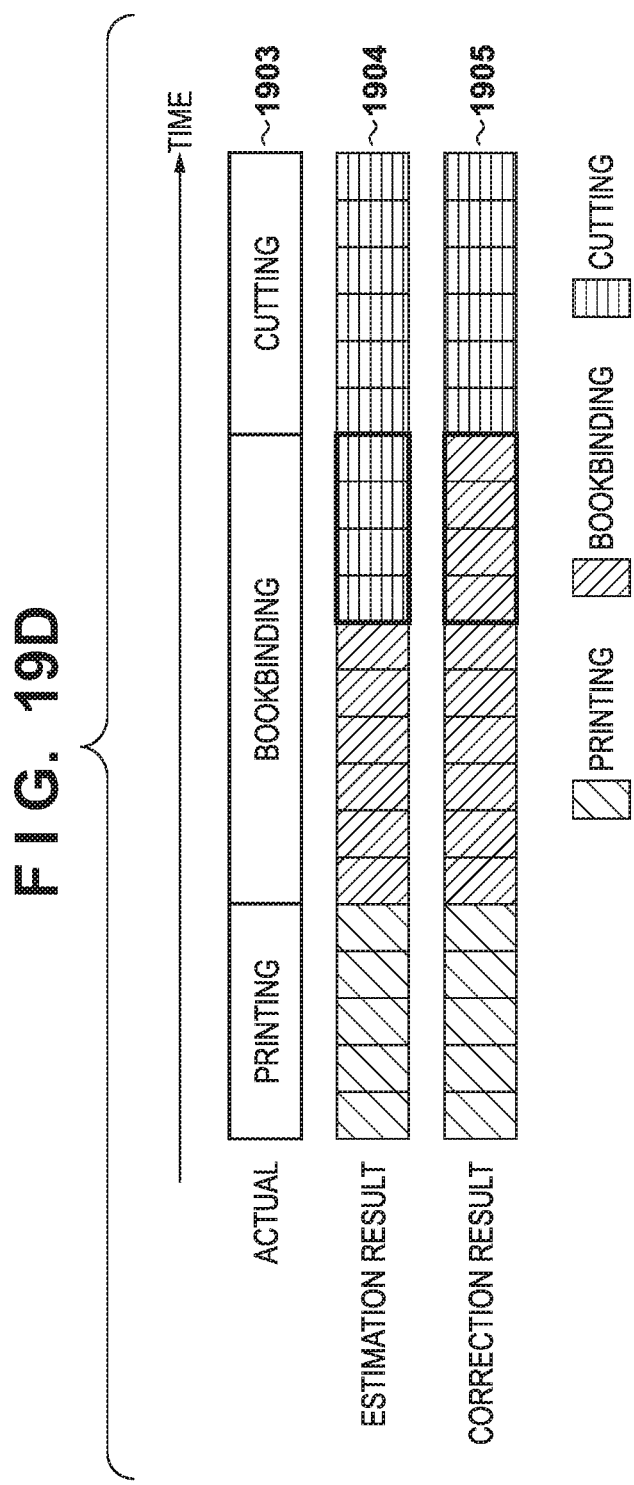

INFORMATION PROCESSING APPARATUS AND METHOD OF CONTROLLING THE SAME

BACKGROUND OF THE INVENTION

Field of the Invention

The present invention relates to a technique of estimating the progress of production in a production site.

Description of the Related Art

In a production site, to grasp the progress of production, information (to be referred to as result information hereinafter) of a work result is collected. Japanese Patent Laid-Open No. 2004-246628 (patent literature 1) discloses a technique of creating result information from a log generated when an apparatus is operated and a log generated when a worker performs a work. More specifically, statistic values such as the mean value, the median value, and the mode value of a plurality of work time data are calculated, and a reliable statistic value is output as result information for each process.

In the technique disclosed in patent literature 1, however, since an estimation value is selected from a plurality of statistic values, result information includes an error. Because of the error in the result information, it may be impossible to obtain an appropriate result by estimation using an estimation model.

SUMMARY OF THE INVENTION

According to one aspect of the present invention, an information processing apparatus comprises: an obtaining unit configured to obtain an estimation result estimated using an estimation model; a determination unit configured to determine a conversion table configured to correct the estimation result using the estimation model based on an estimation accuracy in the estimation model; and a correction unit configured to correct the estimation result based on the conversion table.

An information processing apparatus comprises: an obtaining unit configured to, using a learned model that is obtained by learnings a features of past result information in which a plurality of work processes were performed, thereby outputting a work process in a unit time when result information is input, obtain a work process in a unit time output by the learned model in response to input of new result information; an evaluation unit configured to evaluate matching between a work process in a unit time obtained by the obtaining unit in response to input of first result information and a work process actually performed in the unit time; a determination unit configured to determine a conversion table configured to convert a first work process in the unit time, which is evaluated by the evaluation unit to be lower than a predetermined criterion in a plurality of work processes obtained by the obtaining unit in response to the input of the first result information, to a second work process actually performed in the unit time; and a correction unit configured to correct, using the conversion table, part of a work process obtained by the obtaining unit in response to input of second result information.

According to the present invention, it is possible to obtain a more correct estimation result using an estimation model.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A to 2C are views exemplarily showing various kinds of data used in machine learning;

FIG. 3 is a view showing an example of the functional arrangement of an information processing apparatus according to the first embodiment;

FIGS. 5A to 5E are views exemplarily showing various kinds of data used in processing of a first phase and a correction result;

FIGS. 8A to 8C are views showing examples of a production plan and plan patterns;

FIGS. 9A to 9D are views exemplarily showing various kinds of data used to create a production plan;

FIG. 11 is a flowchart for explaining the operations of an estimation model evaluation unit;

FIGS. 12A to 12D are views exemplarily showing various kinds of data used to evaluate an estimation model;

FIGS. 13A and 13B are, respectively, a flowchart for explaining the operation of a process conversion table creation unit and a process conversion table;

FIGS. 16A to 16C are views exemplarily showing various kinds of data and a correction result obtained in correction processing;

FIGS. 19A to 19D are views exemplarily showing various kinds of data and a correction result obtained in correction processing.

DESCRIPTION OF THE EMBODIMENTS

Figure 1:
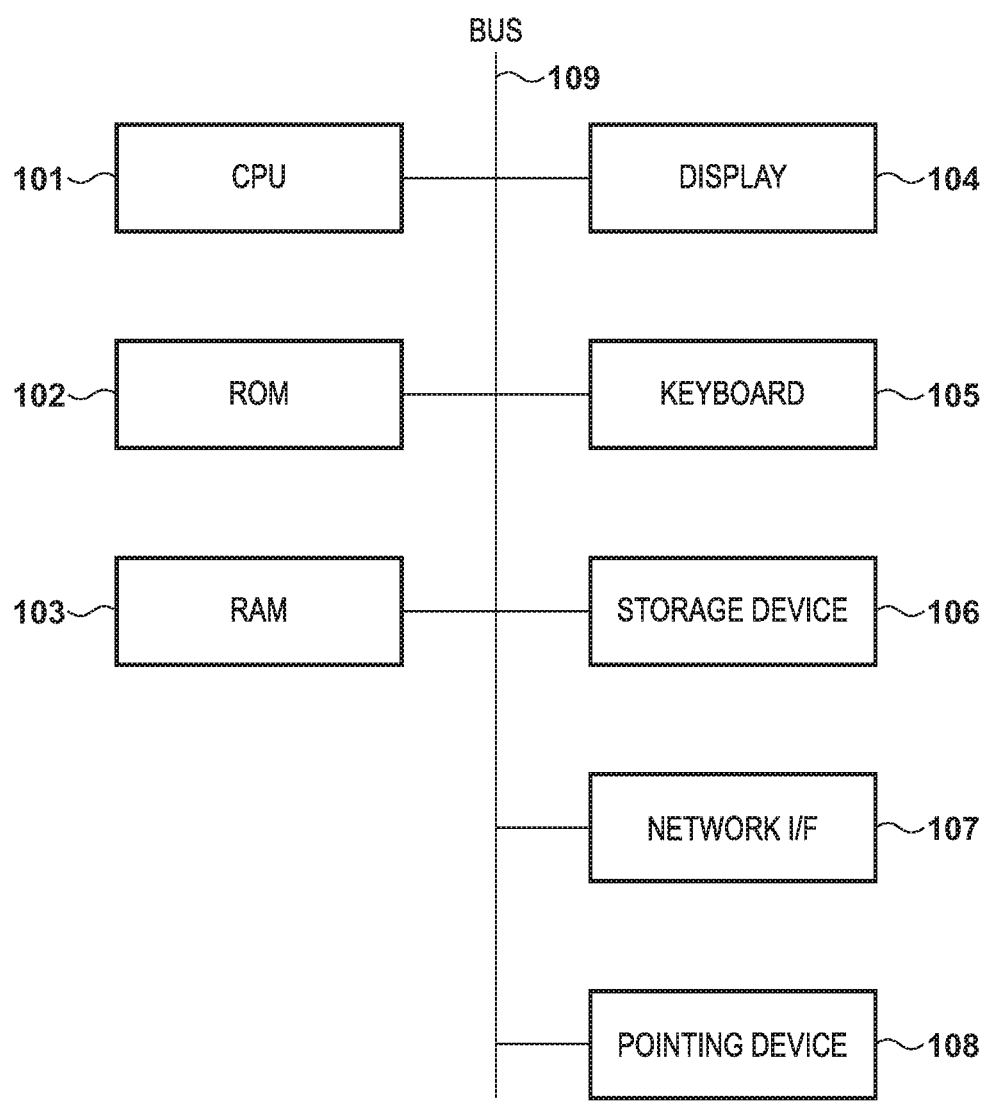
FIG. 1 is a view showing an example of the hardware arrangement of an information processing apparatus.

Hereinafter, embodiments will be described in detail with reference to the accompanying drawings. It should be noted that the following embodiments are not intended to limit the scope of the appended claims. Although a plurality of features are described in the embodiment, not all the features are necessarily essential to the present invention. In addition, the plurality of features may arbitrarily be combined. Furthermore, the same reference numerals denote the same or similar parts throughout the accompanying drawings, and a repetitive description will be omitted.

First Embodiment

As the first embodiment of an information processing apparatus according to the present invention, a form in which an estimation model is created by machine learning to estimate a process, and an estimation result is corrected using the magnitude relationship of a recall and a precision between processes will be described.

<Creation of Estimation Model>

In the first embodiment, a process at each point of time is estimated using an estimation model created by machine learning. Here, the machine learning is a method of empirically learning from (or training based on) data obtained in the past and interpreting newly obtained data based on the learning/training result. In addition, the estimation model is information of a criterion generated by learning the relationship between data obtained in the past and a process at each point of time. A procedure of creating an estimation model will be described first.

To create an estimation model, result information data (feature data) generated by digitizing a feature included in data and correct answer data are input as learning data (also referred as training data) of machine learning. Here, result information is obtained using, as learning data of machine learning, feature data including the position, orientation, and posture of a worker, the operation log of a manufacturing apparatus, and the like at a predetermined time interval. Result information is synonym for track record. In addition, the process of a correct answer at each time interval as correct answer data is input as learning data of machine learning.

FIGS. 2A to 2C are views exemplarily showing various kinds of data used in machine learning. FIG. 2A shows an example of a feature data table 200, FIG. 2B shows an example of a correct answer data table 201, and FIG. 2C shows an example of an estimation result table 202.

The feature data table 200 is a feature data table showing an example of learning data. Here, the feature data table is formed by fields such as "feature ID", "time", "x-coordinate of position", "y-coordinate of position", and "orientation". In a "feature ID" field, an ID used to identify each feature is recorded. In a "time" field, a time at which each feature was obtained is recorded. For example, in the example of FIG. 2A, a feature is obtained at an interval of 1 sec.

In an "x-coordinate of position" field and a "y-coordinate of position" field, the position of a worker at each time in a print site is recorded. For example, in a record of a feature ID "TR000001", the position, orientation, and the like of a worker at time "2017 Jun. 1 09:00:00" are recorded. Here, as for coordinate values, the position of the print site is defined as the origin. A distance in the first direction (for example, east direction) is represented by an x-coordinate, and a distance in the second direction (for example, north direction) orthogonal to the first direction is represented by a y-coordinate. As the coordinate values, values obtained by scaling the distance from the origin may be used. Any expression can be used as long as the position of a worker can be grasped. In an "orientation" field, information concerning the direction a worker is facing is recorded. For example, a vector upward in the vertical direction is defined as V0, and a vector perpendicular (for example, in the north direction) to V0 is defined as V1. Based on V1 as a reference, a vector obtained when rotating clockwise about V0 is defined as V2. The angle made by V1 and V2 at that time is the "orientation". The unit is Degree. These learning data are merely examples, and feature data that can raise the estimation accuracy of the estimation model are used.

The correct answer data table 201 is a correct answer data table representing each feature ID and an actual process corresponding to it. The correct answer data table includes "feature ID" and "actual" fields. In the "feature ID" field, a "feature ID" of the feature data table 200 is recorded. In the "actual" field, the process name of an actual process executed at each point of time is recorded. For example, a record of a feature ID "TR000001" shows that a print process was executed at time TR000001. When the feature data table and the correct answer data table are input as learning data of machine learning, an estimation model configured to estimate processes at a predetermined time interval can be obtained.

A method of obtaining an estimation result using a created estimation model will be described next. To obtain an estimation result using an estimation model, feature data is input to the estimation model. When feature data is input, processes at a predetermined time interval can be estimated.

The estimation result table 202 is an estimation result table showing an estimation result. The estimation result table 202 includes "feature ID" and "estimation result" fields. In the feature ID field, a "feature ID" of the feature data table 200 is recorded. In the "estimation result" field, the process name of a process at each point of time, which was estimated by the estimation model, is recorded.

<Estimation Accuracy ("Recall" and "Precision")>

When feature data (test data) with a correct answer is input to the estimation model, the estimation accuracy of the estimation model can be obtained from the estimation result estimated by the estimation model and the input correct answer. As an index for evaluating how many estimated answers match correct answers, "recall" is used. As an index for evaluating how many correct answers are included in estimated answers, a "precision" is used. For example, assume that when there are six inspection processes at a predetermined time interval, the estimation model estimates that there are five inspection processes. Assume that four answers of these are correct. At this time, the recall is calculated by "the number of correct answers whose estimation results are also correct: 4"""the number of correct answers: 6"=approximately 67%. The precision is calculated by "the number of correct answers in answers estimated as correct answers: 4"±"the number of answers estimated as correct answers: 5"=80%. In the first embodiment, an estimated process is corrected using the estimation accuracy. Note that in the following explanation, the terms "recall" and "precision" are extendedly used even in a case of an incorrect answer. Details will be described later with reference to FIGS. 5A and 5B.

<Outline of Processing>

Processing according to the first embodiment is roughly divided into two phases. In the first phase, a table configured to convert daily feature data accumulated in a past production activity into a process is created. Note that the past production activity includes not only a production activity based on a production plan but also a production activity based on an instruction outside a production plan. In the second phase, a process is estimated and corrected from feature data obtained from a production activity based on a given daily production plan.

More specifically, in the first phase, feature data obtained from a production activity in a production site is accumulated for a predetermined period (for example, one day). A correct answer is given to the accumulated feature data to create correct answer data. The feature data and the correct answer data are input to machine learning to create an estimation model. For the created estimation model, a confusion matrix is obtained by, for example, cross-validation, and an estimation accuracy is calculated. Based on the magnitude relationship between processes at the calculated estimation accuracy, for a process of a low estimation accuracy, a process conversion destination is determined, and the process conversion source and the conversion destination are stored as a set in a process conversion table. In the second phase, a process is estimated from the daily feature data, and an estimation result is derived. The estimation result is corrected using the process conversion table generated in the first phase. The estimation accuracy becomes low because actual correct answer data (a work process in a unit time) sometimes changes even if "time", "x-coordinate of position", "y-coordinate of position", and "orientation", which constitute the feature data (result information) shown in FIG. 2A, hardly change. In this case, the work process estimated from the feature data cannot be separated well, resulting in an estimation error. It is considered that when types of data that constitute the feature data are increased, a difference is generated in the feature data, and the possibility that the work process can be separated and estimated well becomes high. However, to increase the types of data that constitute the feature data, types of sensors need to be increased, resulting in a heavy load. Additionally, it is difficult to decide in advance which sensors should be increased to raise the separation performance and raise the estimation accuracy. Hence, an estimation result is corrected using a conversion table, as in this case.

<Apparatus Arrangement>

FIG. 1 is a view showing an example of the hardware arrangement of an information processing apparatus. Note that the information processing apparatus is shown as a single computer apparatus here, but may be implemented by distributing functions to a plurality of computer apparatuses. For example, if the information processing apparatus is formed by a plurality of computer apparatuses, they are connected by a LAN (Local Area Network) or the like to be communicable with each other.

A CPU (Central Processing Unit) 101 is a device that loads, interprets, and executes a program stored on a storage device 106 and controls, via a bus 109, a RAM 103, a display 104, and the like connected to the bus. A ROM (Read Only Memory) 102 is a read only memory that controls input/output to/from hardware connected to the bus. A RAM (Random Access Memory) 103 is a random access memory that temporarily stores information when the CPU 101 performs an operation.

The display 104 is a display that displays a calculation result by the CPU 101. The keyboard 105 accepts an input from a user. If the information processing apparatus is a smart device, it includes a touch panel, and therefore, the keyboard 105 need not be attached.

The storage device 106 is a storage device that stores programs and data to be used for calculations. A network I/F 107 is a network I/F (interface) connected to a network such as a local network, an intranet, or the Internet. A pointing device 108 is a pointing device such as a mouse or a trackball that accepts coordinates designated on a screen by the user. The bus 109 is a bus that is a signal line configured to connect the above-described units.

When the CPU 101 executes processing based on a program stored in the storage device 106, functions and operations to be described later are implemented.

FIG. 3 is a view showing an example of the functional arrangement of an information processing apparatus according to the first embodiment.

A learning data creation unit 301 manages a schedule and a result of feature data, correct answer data, an estimation result, and the like. An estimation model creation unit 302 creates, based on the information managed by the learning data creation unit 301, an estimation model configured to estimate a process. An estimation unit 303 estimates a process from feature data, based on the estimation model. An estimation model evaluation unit 304 evaluates the estimation model using the result estimated by the estimation model.

A data obtaining unit 305 obtains a log or information of a worker from a printing apparatus, a processing apparatus, and a portable terminal. A process conversion table creation unit 306 creates a process conversion table based on the evaluation result of the estimation model. A process conversion judging unit 307 determines to which process an estimated process is to be converted. A correction unit 308 corrects an estimation result. An estimation result management unit 309 manages the result estimated by the estimation model.

A printing apparatus 310 forms an image on a printing paper sheet based on a print instruction from the outside. A print log output unit 311 outputs a log in accordance with the operation state of the printing apparatus 310. A processing apparatus 312 processes a printed product based on a processing instruction from the outside. A processing log output unit 313 outputs a log in accordance with the operation state of the processing apparatus 312.

A portable terminal 314 is configured to be able to collect information concerning the state of a portable terminal by sensors such as an acceleration sensor and a gyro sensor. A worker information calculation unit 315 calculates information concerning the state of a worker based on the information collected by the sensors.

<Operation of Apparatus>
<Procedure of Processing in First Phase>

As described above, in the first phase, an estimation model is created, and a process conversion table is created based on the estimation accuracy of the estimation model. First, the data obtaining unit 305 of an information processing apparatus 300 obtains various kinds of raw data of a print log, a processing log, and worker information from the printing apparatus 310, the processing apparatus 312, and the portable terminal 314. The learning data creation unit 301 converts the obtained raw data into the format of the feature data table 200 and stores the data. Next, correct answer data is created for feature data at each time and stored in the correct answer data table 201.

As a correct answer data creation method, for example, workers and production apparatuses included in a video obtained by capturing the production site are observed, and what kind of process was performed from a certain time to a certain time is recorded. Alternatively, observers who observe workers and production apparatuses may be arranged in the production site, and the observers may be cause to record the type of a process and a time at which the process was performed.

The estimation model creation unit 302 receives the feature data table 200 and the correct answer data table 201 as learning data, and creates an estimation model. Next, the estimation model evaluation unit 304 receives the feature data table 200 and the correct answer data table 201, and calculates the estimation accuracy of the estimation model by cross-validation. At this time, according to the method of cross-validation, the feature data table 200 is input to the estimation unit 303, and an estimation result shown in the estimation result table 202 is obtained and stored in the estimation result management unit 309. A confusion matrix is created from the estimation result table 202 and the correct answer data table 201, and a recall table and a precision table are created. Note that the confusion matrix, the recall table, and the precision table are created using known techniques.

FIGS. 5A to 5D are views exemplarily showing various kinds of data used in processing of the first phase. FIG. 5A shows an example of a recall table, and FIG. 5B shows an example of a precision table.

In a recall table 501, each row represents the process of an estimation result, and each column represents an actual process. In each element, the value of "recall" that is the first index value calculated based on past result information is set. The recall is an index for evaluating a correct answer, as described above, but is also used as an index for evaluating an incorrect answer in the following description. More specifically, each element of the recall table 501 represents a ratio that in a case in which the actual process is a certain process of interest, the certain process is estimated. That is, the value of a recall is obtained by dividing the number of processes as estimation results by the total number of actual processes in an actual process (a column of the recall table 501). For example, if focus is placed on the "printing" process that is an actual process in the recall table 501, the ratio of processes estimated as the "printing" process (that is, the ratio of correct answers) is 79%. On the other hand, if focus is placed on the "cutting" process that is an actual process in the recall table 501, the ratios of processes estimated as the "printing" process and the "bookbinding" process (that is, the ratios of incorrect answers) are 20% and 30%, respectively.

In the precision table 502, each row represents an actual process, and each column represents the process of an estimation result. In each element, the value of "precision" that is the second index calculated based on past result information is set. The precision is an index for evaluating a correct answer, as described above, but is also used as an index for evaluating an incorrect answer in the following description. More specifically, each element of the precision table 502 represents a ratio that in a case in which the process of an estimation result is a certain process of interest, the actual process is the certain process. That is, the value of a precision is obtained by dividing the number of actual processes by the total number of processes of estimation results in the process of a certain estimation result (a column of the precision table 502). For example, if focus is placed on the "cutting" process that is an actual process in the precision table 502, the ratio of processes estimated as the "cutting" process (that is, the ratio of correct answers) is 5%. On the other hand, the ratios of processes estimated as the "printing" process and the "bookbinding" process (that is, the ratios of incorrect answers) are 39% and 40%, respectively.

Next, the process conversion table creation unit 306 creates a process conversion table based on the recall table and the precision table.

<Procedure of Processing in Process Conversion Table Creation Unit>

Figure 4A:
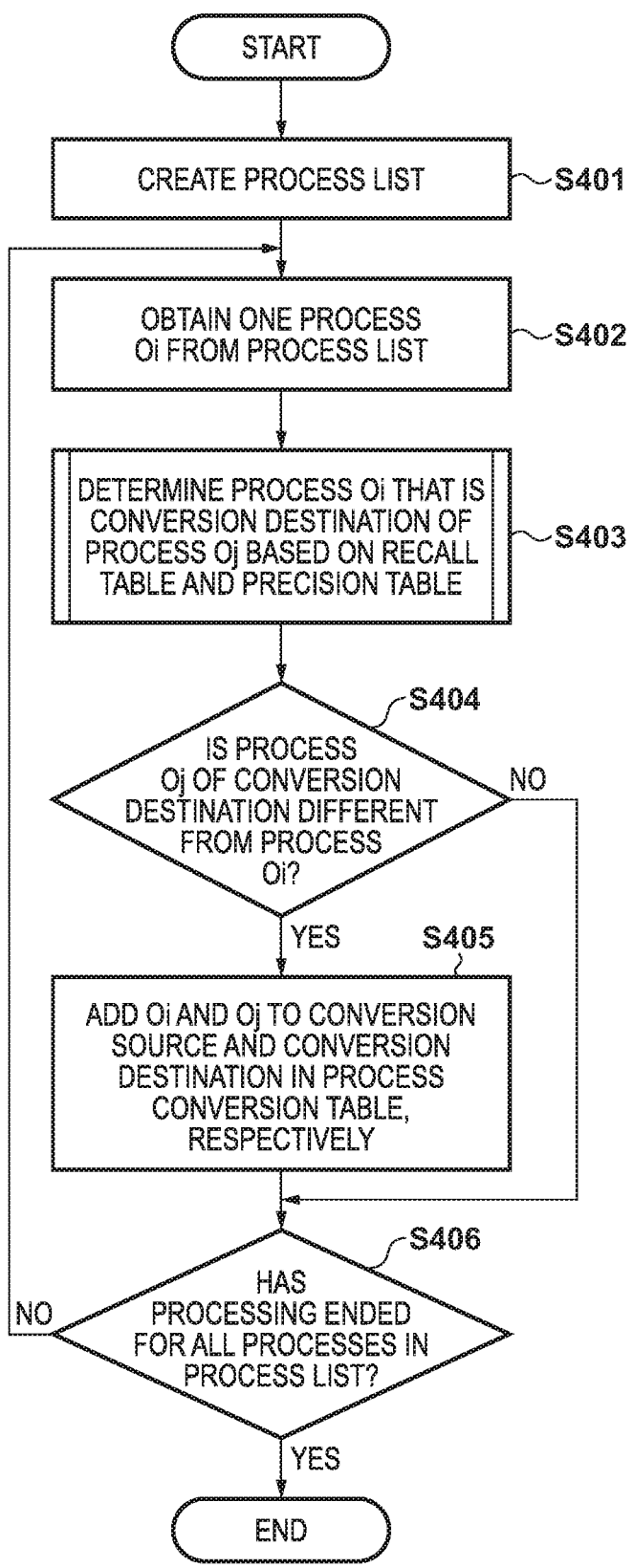
FIGS. 4A and 4B are flowcharts for explaining the operations of a process conversion table creation unit and a correction unit.

FIG. 4A is a flowchart for explaining the processing operation of the process conversion table creation unit 306.

In step S401, the process conversion table creation unit 306 obtains process names in the first column of the recall table 501 and creates a process list. FIG. 5C shows an example of a process list. In a process list 503, each record represents a process, and an ID used to identify each process is recorded in a "process list ID" field. In a "process" field, the process name of each process is recorded.

In step S402, the process conversion table creation unit 306 obtains one process Oi from the process list. In step S403, the process conversion table creation unit 306 determines a process Oj that is the conversion destination of the process Oi based on the recall table and the precision table. The determination method will be described later with reference to FIGS. 5A to 5D and 6. In step S404, the process conversion table creation unit 306 judges whether the process Oj of the conversion destination is different from the process Oi. If the processes are different, the processing advances to step S405. If the processes are the same, the processing advances to step S406.

In step S405, the process conversion table creation unit 306 adds Oi and Oj to the conversion source and the conversion destination in the process conversion table, respectively. FIG. 5D shows an example of the process conversion table. In a process conversion table 504, each record represents a correspondence indicating to which process a certain process should be converted. In a "process conversion ID" field, an ID used to identify each record of the process conversion table is recorded. In a "conversion source" field, the process name of the process of a conversion source is recorded. In a "conversion destination" field, the process name of the process of a conversion destination representing to which process the processing of the conversion source should be converted is recorded.

In step S406, the process conversion table creation unit 306 judges whether the processing has ended for all processes in the process list. If the processing has ended, the processing of the process conversion table creation unit 306 is ended. If the processing has not ended, the processing returns to step S402.

Figure 6A:
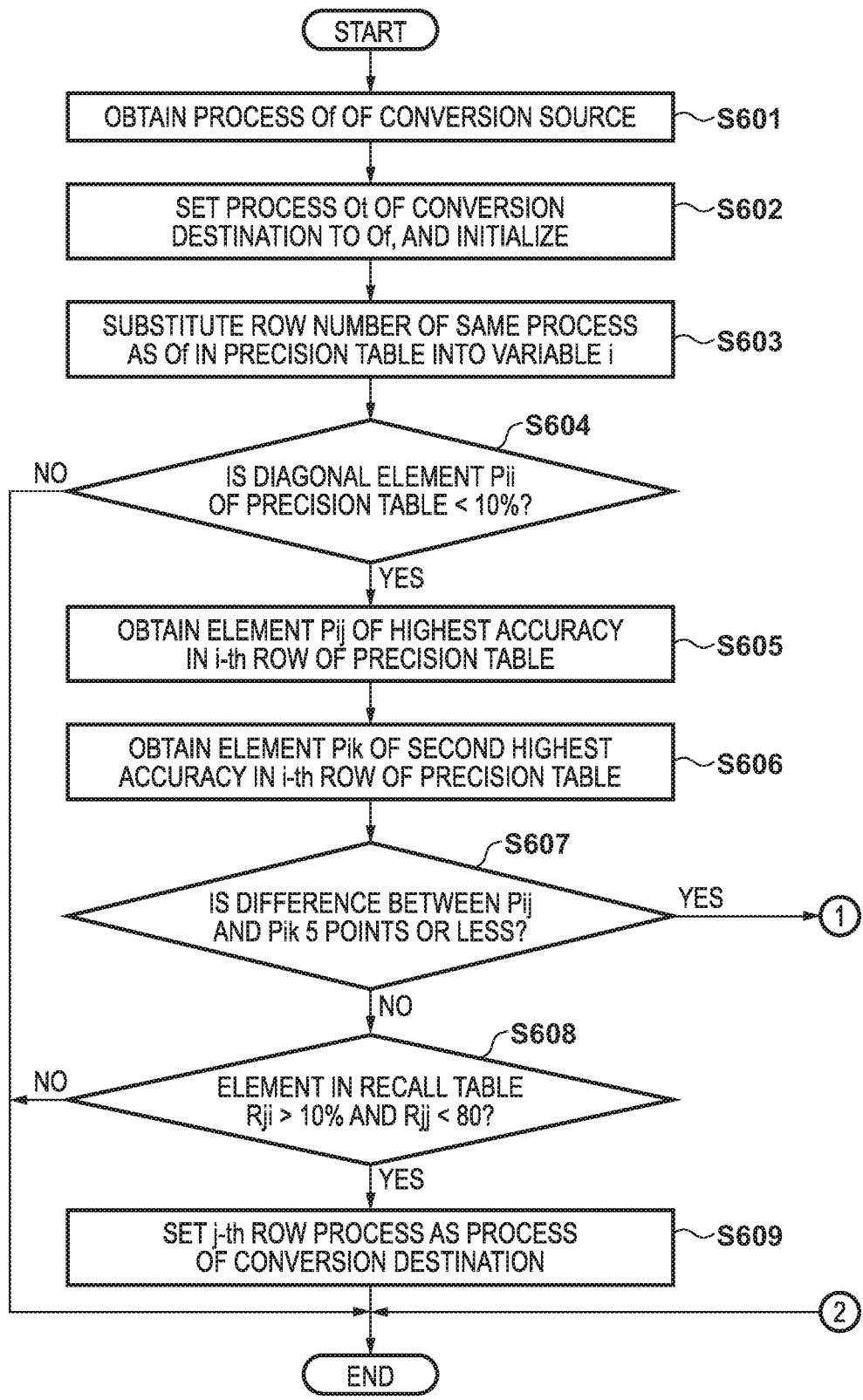
FIGS. 6A and 6B are flowcharts for explaining the operation of a process conversion judging unit.
Figure 6B:
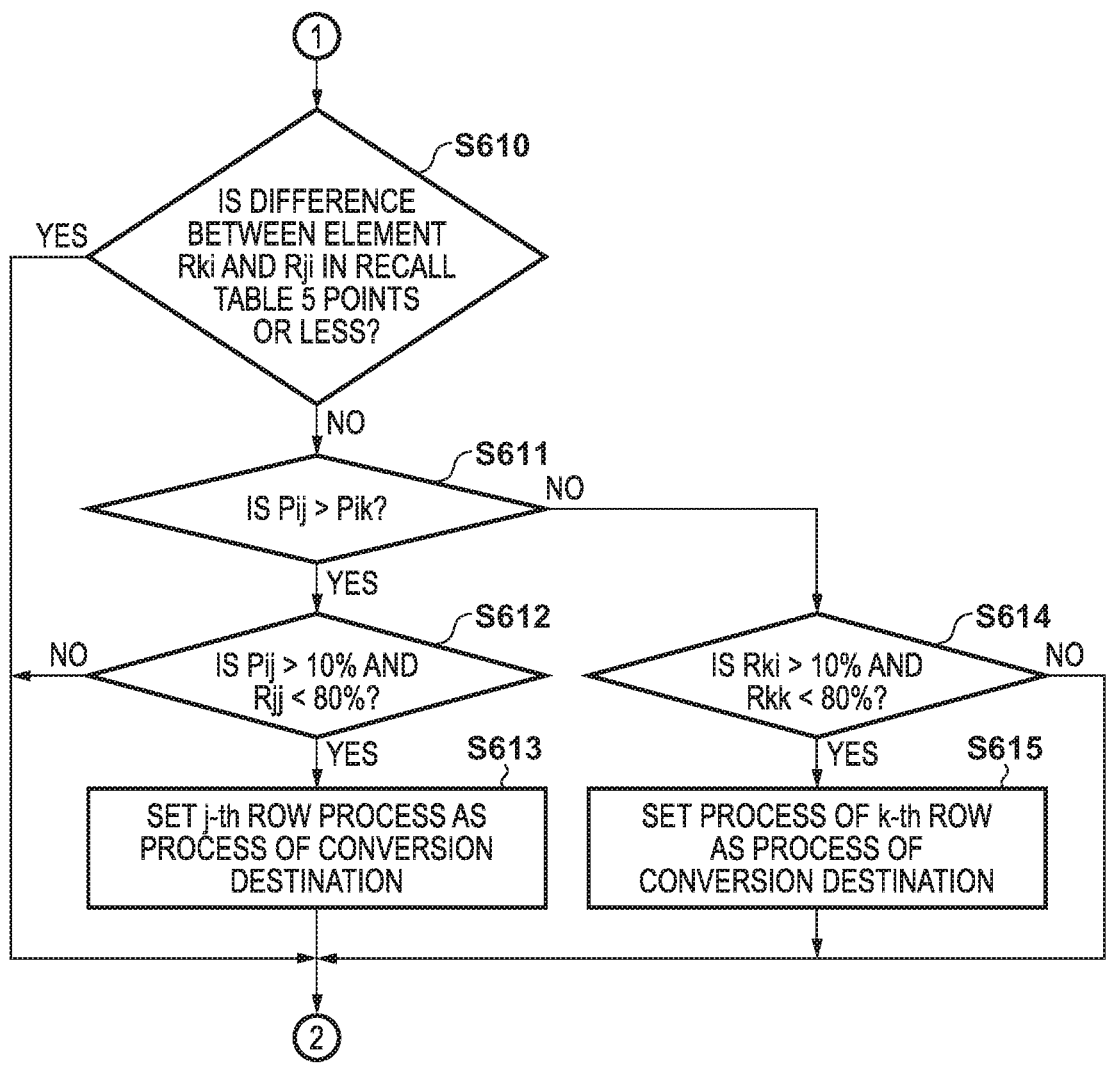

FIGS. 6A and 6B are a flowchart for explaining the operation of the process conversion judging unit. That is, this is processing of the process conversion judging unit 307 invoked in step S403.

In step S601, the process conversion judging unit 307 obtains the process of a conversion source, and stores it in a variable Of. This process has the same value as the process Oi in step S402 described above. In step S602, the process conversion judging unit 307 stores Of in a variable Ot representing the process of the conversion destination, and initializes Ot. This is to store Of in Ot and ending the processing of the process conversion judging unit 307 if Of is not the process of the conversion target.

In step S603, the process conversion judging unit 307 substitutes the process row number of the same process name as Of in the precision table into a variable i. In step S604, the process conversion judging unit 307 judges whether a probability Pii that the process of the ith row is correctly estimated as the process of the ith row is less than 10% (first threshold) in the precision table. As the result of the judgment, if Pii is less than 10%, it is judged that the estimation accuracy of the process Of is low, and the processing advances to step S605. On the other hand, if Pii is 10% or more, it is judged that it cannot be said that the estimation accuracy of the process Of is low, and the processing of the process conversion judging unit 307 is ended. Here, the judgment is done using the value "10%". However, the present invention is not limited to this, and the judgment can be done based on a certain reference value. In addition, the reference value may be described in a setting file in advance and loaded. Alternatively, a user interface (UI) may be displayed, and the user may be caused to input the value. This also applies to numerical values used for judgment in the following explanation.

In step S605, the process conversion judging unit 307 obtains an element Pij of the highest accuracy in the ith row of the precision table. In step S606, the process conversion judging unit 307 obtains an element Pik of the second highest accuracy in the ith row of the precision table. In step S607, the process conversion judging unit 307 judges whether the difference between Pij and Pik is 5 points or less. If the difference is 5 points or less, the difference between Pij and Pik is small, and both processes can be the process of the conversion destination. Hence, to narrow down the process of the conversion destination, the processing advances to step S608. On the other hand, if the difference is larger than 5 points, the process in the jth row can be regarded as the candidate of the process of the conversion destination. Hence, to judge whether the process in the jth row is appropriate as the process of the conversion destination, the processing advances to step S609.

In step S608, to judge whether the process in the jth row is appropriate as the process of the conversion destination, the process conversion judging unit 307 judges whether an element Rij in the recall table is larger than 10% and whether Rjj is less than 80%. If both conditions are satisfied, it is judged that the process in the jth row is appropriate as the candidate of the process of the conversion destination, and the processing advances to step S609. On the other hand, if at least one of the conditions is not satisfied, it is judged that a process that is appropriate as the process of the conversion destination does not exist, and the processing of the process conversion judging unit 307 is ended.

In step S609, the process conversion judging unit 307 sets the process in the jth row to the variable Ot as the process of the conversion destination, and the processing of the process conversion judging unit 307 is ended.

In step S610, the process conversion judging unit 307 judges whether the difference between an element Rki and Rji in the recall table is 5 points or less. If the difference is 5 points or less, the estimation accuracy of the process in the jth row and that of the process in the kth row do not have a large difference. It is therefore judged that it is appropriate not to convert the process to any process, and the processing of the process conversion judging unit 307 is ended. On the other hand, if the difference is larger than 5 points, to further check the magnitude relationship between the recalls of the processes, the processing advances to step S611.

In step S611, the process conversion judging unit 307 judges whether Rji is larger than Rki. If Rji is larger, it is judged that the process in the jth row is appropriate as the candidate of the process of the conversion destination, and the processing advances to step S612. On the other hand, if Rji is equal to or smaller than Rkj, it is judged that the process in the kth row is appropriate as the candidate of the process of the conversion destination, and the processing advances to step S614.

In step S612, the process conversion judging unit 307 judges whether Rji is larger than 10% and whether Rjj is smaller than 80%. If both conditions are satisfied, it is judged that the process in the jth row is appropriate as the process of the conversion destination, and the processing advances to step S613. In step S613, the process conversion judging unit 307 sets the process in the jth row to the variable Ot as the process of the conversion destination, and the processing of the process conversion judging unit 307 is ended. On the other hand, if at least one of the conditions is not satisfied, it is judged that the process is not appropriate as the process of the conversion destination, and the processing of the process conversion judging unit 307 is ended.

In step S614, the process conversion judging unit 307 judges whether Rki is larger than 10% and whether Rkk is smaller than 80%. If both conditions are satisfied, it is judged that the process in the kth row is appropriate as the process of the conversion destination, and the processing advances to step S615. In step S615, the process conversion judging unit 307 sets the process in the kth row to the variable Ot as the process of the conversion destination, and the processing of the process conversion judging unit 307 is ended. On the other hand, if at least one of the conditions is not satisfied, it is judged that the process is not appropriate as the process of the conversion destination, and the processing of the process conversion judging unit 307 is ended.

<Procedure of Processing in Second Phase>

As described above, in the second phase, a process is estimated from feature data obtained from a daily production activity and corrected. Correction by the correction unit 308 for a process estimated by the estimation unit 303 based on feature data will be described below.

<Procedure of Processing in Correction Unit>

Figure 4B:
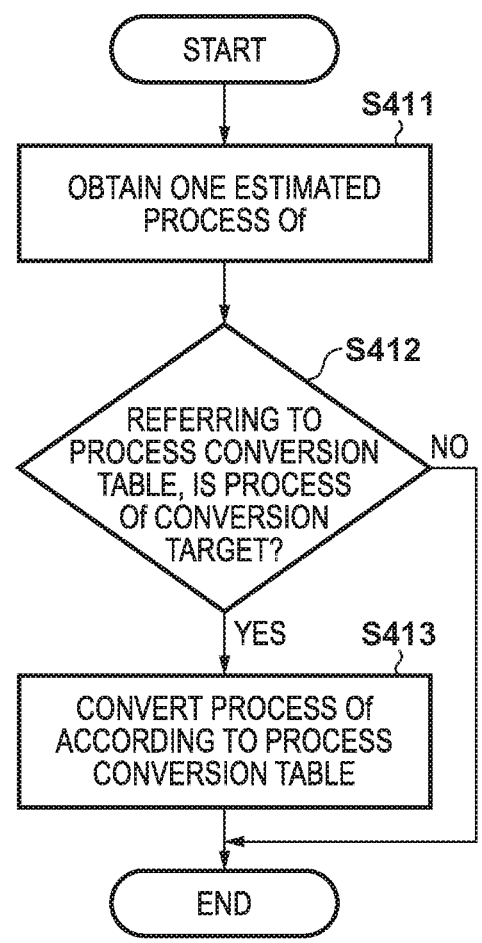

FIG. 4B is a flowchart for explaining the processing operation of the correction unit 308. In step S411, the correction unit 308 obtains one estimated process and stores it in the variable Of. In step S412, the correction unit 308 refers to the process conversion table, and judges whether Of is a conversion target. More specifically, it is judged whether a process that matches Of exists in the conversion source field of the process conversion table. If a process that matches Of exists, it is judged that the process of the conversion destination exists, and the processing advances to step S413. On the other hand, if a process that matches Of does not exist, it is judged that the process of the conversion destination does not exist, and the processing of the correction unit 308 is ended.

In step S413, the correction unit 308 obtains the process of the conversion destination of from the process conversion table, and converts the processing of the estimation result into the obtained process of the conversion destination.

FIG. 5E shows an example of a correction result obtained by the above-described processing. A time series 505 represents the time series of actual processes at respective times. A time series 506 represents the time series of the processes of estimation results at times, which are estimated using an estimation model based on feature data in a given processing plan. A bold frame in the time series 506 indicates a portion where the estimation is wrong. Here, a process that is actually "bookbinding" is erroneously estimated as "cutting". A time series 507 represents the time series of the processes of correction results at times. A bold frame in the time series 507 indicates a portion corrected by the correction unit 308. Here, the result of properly correcting a process to "bookbinding" by the above-described processing is exemplarily shown.

As described above, according to the first embodiment, a confusion matrix is created from an estimation result and correct answer data, and a recall table and a precision table are created. A process conversion table is created based on the recall table and the precision table. When the estimation result is corrected using the thus obtained process conversion table, a more accurate estimation result can be obtained.

Second Embodiment

In the above-described first embodiment, a certain process of a conversion source is uniformly converted into another certain process of a conversion destination. For this reason, in a correction result, the process of the conversion source does not appear at all. To cope with a production site where such conversion is not preferable, in the second embodiment, a concept "plan pattern" is introduced, and an estimation result is corrected based on the estimation accuracy of each plan pattern. Here, the plan pattern indicates an aggregate that regards a plurality of processes as one group.

<Production Site and Plan Pattern>

Examples of a production site and a plan pattern assumed in the second embodiment will be described below with reference to FIGS. 7, 8A to 8C, and 9A to 9D.

Figure 7:
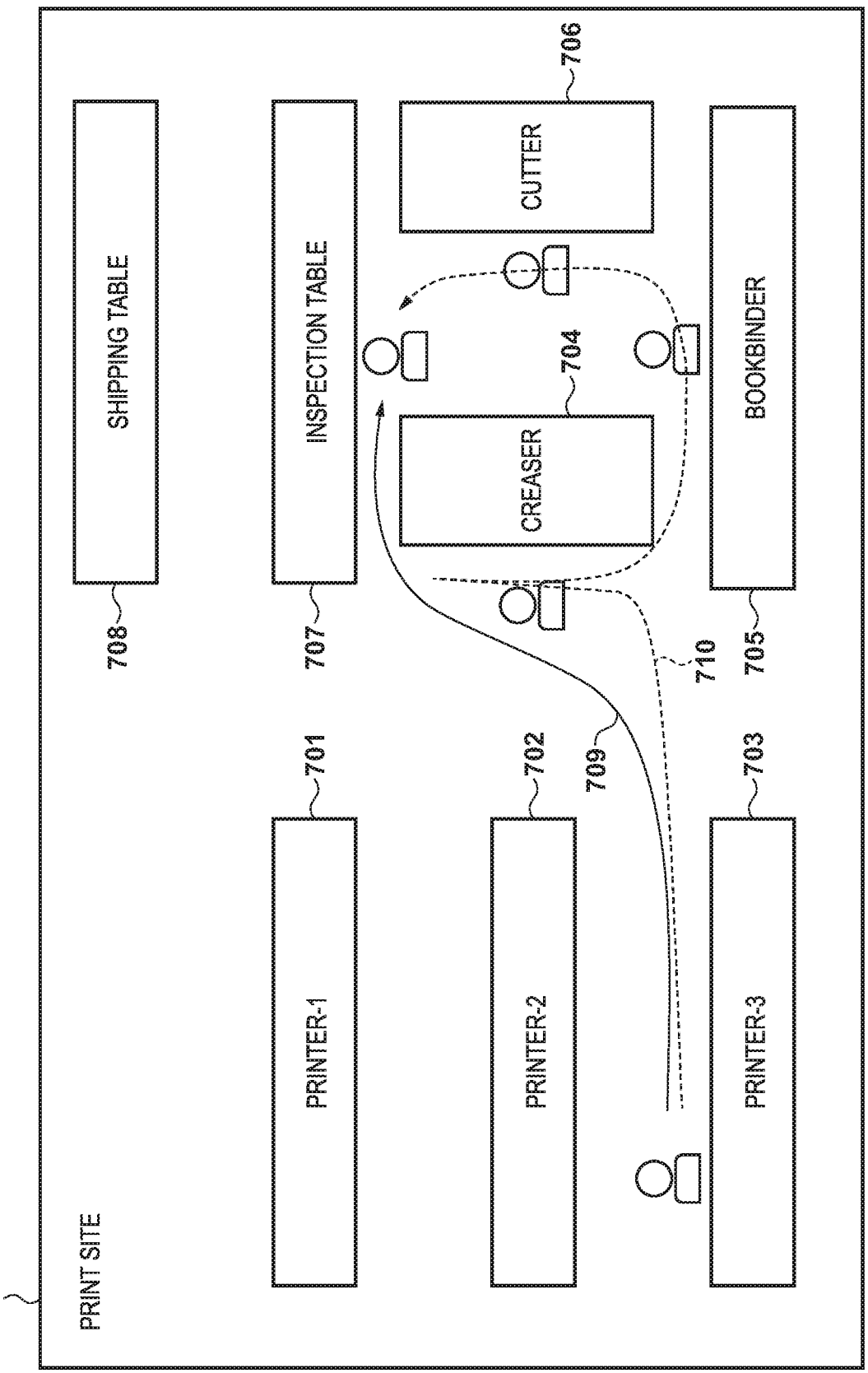
FIG. 7 is a view exemplarily showing a layout of various kinds of equipment in a print site.

FIG. 7 is a view exemplarily showing the layout of various kinds of equipment in a print site. In a print site 700 that is a work space, printers 701 to 703 that perform printing on paper sheets, a creaser 704 that performs creasing for the paper sheets, a binder 705 that bookbinds the paper sheets, and a cutter 706 that cuts the paper sheets are arranged. In addition, an inspection table 707 on which printed products are inspected, and a shipping table 708 on which printed products that are inspected and prepared for shipment are placed are arranged. A solid arrow 709 indicates the traffic line of a worker when manufacturing merchandise of leaflet printing including two processes "printing" and "inspection". A dotted arrow 710 indicates the traffic line of a worker at the time of the manufacture of merchandise of a booklet including five processes (printing, creasing, bookbinding, cutting, and inspection).

FIGS. 8A to 8C are views showing examples of a production plan and plan patterns. FIG. 8A shows a production plan of a certain day in the production site 700. The abscissa represents time, and works are carried out in the order of printing, inspection, creasing, bookbinding, cutting, and inspection. FIG. 8B shows an example of a plan pattern table that defines each plan pattern. In an example of a plan pattern table 800 shown in FIG. 8B, each record represents a plan pattern. In a "plan pattern ID" field, an ID used to identify each plan pattern is recorded. In fields of "process 1", "process 2", . . . , the process names of one or more processes that constitute a plan pattern are recorded. The number of processes changes depending on the plan pattern. As shown in FIG. 8B, a plan pattern formed from two processes exists, and another plan pattern formed from five processes also exists.

When estimating a process, the position information of a worker is used as feature data. Hence, when the worker passes by the creaser 704 when passing through the traffic line 709, as shown in FIG. 7, it may erroneously be estimated that the "creasing" process is performed even if the "creasing" process is not included in the manufacturing process of the leaflet merchandise. On the other hand, since the "creasing" process is included in the manufacturing process of the booklet merchandise, the worker performs the work on the periphery of the creaser 704, and this is correctly estimated.

However, when evaluating the estimation result, in a general confusion matrix, the estimation accuracy is calculated as an estimation accuracy in the "creasing" process. For this reason, an estimation result obtained when tracking a traffic line that readily causes an estimation error and an estimation result obtained when tracking a traffic line that hardly causes an estimation error are mixed and totalized. If this is corrected by the method of the above-described first embodiment, even a reliable estimation result is erroneously corrected to another process. In the second embodiment, a plan pattern for which the estimation result will be unreliable and a plan pattern for which the estimation result will be not so are discriminated, thereby performing more appropriate correction.

FIGS. 9A to 9D are views exemplarily showing various kinds of data (plan information) used to create a plan pattern and a production plan.

FIG. 9A shows a merchandise table 900 that is formed by "merchandise ID", "merchandise name", and "process ID" fields. In the "merchandise ID" field, an ID used to identify each merchandise is recorded. In the "merchandise name" field, the name of merchandise is recorded. In the "process ID" field, the process ID of the first process for making merchandise is recorded. For the "process ID", a process ID field of a process table 901 to be described later is referred to.

FIG. 9B shows the process table 901 that is formed by "process ID", "process name", "resource ID", "next process ID", and "unit work time" fields. In the "process ID" field, an ID used to identify each process is recorded. In the "process name" field, the name of a process is recorded. In the "resource ID", the resource ID of a resource used in the process is recorded. For the "resource ID", a resource ID field of a resource table 902 to be described later is referred to. In the "next process ID", the process ID of a process next to the process is recorded. Note that for the next process ID, the process ID field of the process table 901 is referred to. In the "unit work time" field, the unit work time of the process is recorded.

FIG. 9C shows the resource table 902 that is formed by "resource ID" and "resource name" fields. In the "resource ID" field, an ID used to identify each resource is recorded. In the "resource name" field, the name of each resource is recorded.

FIG. 9D shows an order table 903 that is formed by "order item ID", "merchandise ID", "order quantity", "page count", "manufacture term", and "order reception date/time" fields. In the "order item ID" field, an ID used to identify each order item is recorded. In the "merchandise ID" field, the merchandise ID of merchandise ordered by the order item is recorded. The merchandise ID can be specified by referring to the merchandise ID field of the merchandise table 900. In the "order quantity" field, the quantity of ordered merchandise is recorded. The unit is "copies". In the "page count" field, the number of pages of ordered merchandise is recorded. In the "manufacture term" field, the date/time of a term at which the manufacture of ordered merchandise must be completed is recorded. In the "order reception date/time" field, the date/time of order reception is record.

<Apparatus Arrangement>

Figure 10:
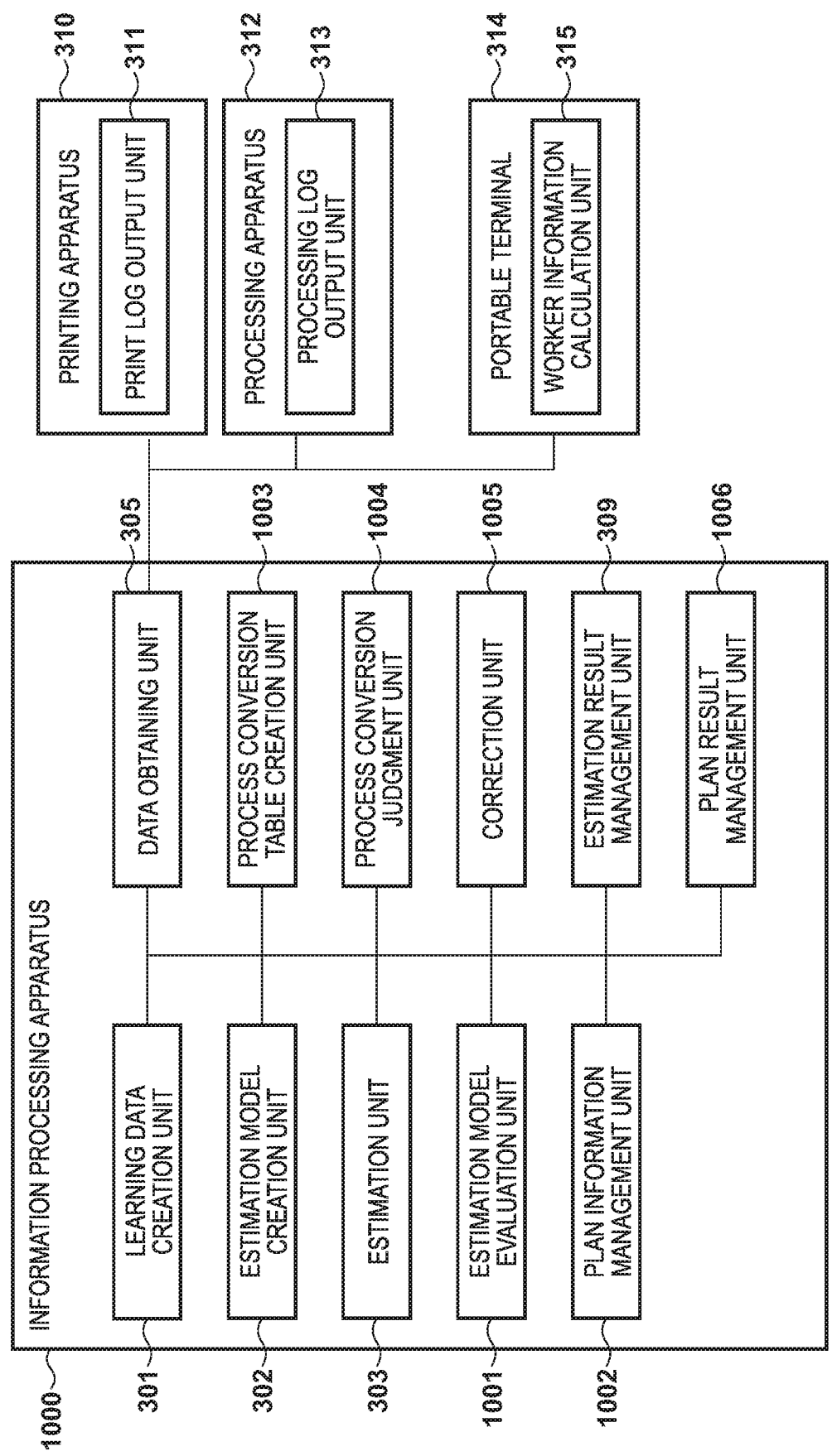
FIG. 10 is a view showing an example of the functional arrangement of an information processing apparatus according to the second embodiment.

FIG. 10 is a view showing an example of the functional arrangement of an information processing apparatus according to the second embodiment. Note that the hardware arrangement is similar to the first embodiment, and a description thereof will be omitted. Note that the same reference numerals as in the first embodiment denote constituent elements of the same functions in the following explanation, and a description will be omitted.

An estimation model evaluation unit 1001 evaluates an estimation model. A plan information management unit 1002 manages plan information and a plan pattern. A process conversion table creation unit 1003 creates a process conversion table. A process conversion judging unit 1004 judges whether to convert a process. A correction unit 1005 corrects an estimation result. A plan result management unit 1006 manages a plan result.

<Procedure of Processing in Estimation Model Evaluation Unit>

FIG. 11 is a flowchart for explaining the operations of the estimation model evaluation unit 1001.

In step S1101, the estimation model evaluation unit 1001 creates a confusion matrix from feature data and correct answer data managed by a learning data creation unit 301. The confusion matrix creation method is a known technique, and a detailed description thereof will be omitted.

In step S1102, the estimation model evaluation unit 1001 creates a confusion matrix with plan patterns based on a feature data table 200, an estimation result table 202, a correct answer data table 201, a plan result table (to be described later), and a plan pattern table 800.

FIGS. 12A to 12D are views exemplarily showing various kinds of data used for estimation model evaluation. FIG. 12A shows an example of a plan result table 1200. Note that the plan result table may be created by a production plan creation apparatus provided outside the information processing apparatus. In addition, the plan result table may be created manually, or may be created by any method.

In the plan result table 1200, each record represents a plan result. In a "plan result ID" field, an ID used to identify each plan result is recorded. In a "resource ID" field, the resource ID of a resource to be used is recorded. In a "process ID" field, the process ID of a planned process is recorded. In a "process name" field, the process name of a planned process is recorded. In a "start time" field, the start time of a planned process is recorded. In an "end time" field, the end time of a planned process is recorded.

FIG. 12B shows a confusion matrix with plan patterns, which is a confusion matrix obtained by totalizing estimation results for each plan pattern. In a confusion matrix 1201 with plan patterns, each row represents an actual process in a certain plan pattern, and each column represents an estimated process. Each component represents the number of processes actually performed in a certain plan pattern or the number of estimated processes.

A method of creating the confusion matrix with plan patterns will be described below. First, the records of the estimation result table 202 are processed one by one from the start. One record of an estimation result is obtained, and the estimation result is referred to, thereby specifying a column of the confusion matrix 1201 with plan patterns to which 1 should be added. In addition, a feature ID in the correct answer data table 201, which has the same value as the feature ID of the record, is specified, and the value of the actual field is obtained. A process in the confusion matrix 1201 with plan patterns in which 1 should be added to a row, is thus specified.

Next, the feature ID field of the feature data table 200 is searched for a value that matches the feature ID of one record of the estimation result obtained before. Then, the time of the record of the matching value is obtained. Next, to specify a process whose work should be carried out at that time in the plan, the start time field and the end time field of the plan result table 1200 are referred to. A plan result whose start time is earlier than the time and whose end time is later is specified. The specified plan result and the preceding and succeeding process name fields are obtained, each process field of the plan pattern table 800 is referred to, and a plan pattern to which the plan result belongs is specified. More specifically, for example, assume that the process name of the specified plan result is "creasing", and the preceding and succeeding plan results are "printing" and "bookbinding", respectively. At this time, the process fields of "process 1" and "process 2" of the plan pattern table 800 are referred to, and the plan pattern ID of a plan pattern including "printing", "creasing", and "bookbinding" in the string of processes is specified.

With the above-described processing, the row and the column of the confusion matrix 1201 with plan patterns, to which 1 should be added, can be specified. Hence, 1 is added to the component. The confusion matrix 1201 with plan patterns is created by executing this processing for all records of the estimation result table 202.

In step S1103, the estimation model evaluation unit 1001 totalizes the confusion matrix 1201 with plan patterns for each plan pattern, and creates a recall table with plan patterns. FIG. 12C shows a recall table with plan patterns in which each row represents an actual process in a certain plan pattern, and each column represents an estimated process. Each component represents a recall in a certain plan pattern.

In step S1104, the estimation model evaluation unit 1001 totalizes the confusion matrix 1201 with plan patterns for each plan pattern, and creates a precision table with plan patterns. FIG. 12D shows a precision table with plan patterns in which each row represents an estimated process in a certain plan pattern, and each column represents an actual process. Each component represents a precision in a certain plan pattern.

<Procedure of Processing in Process Conversion Table Creation Unit>

Figure 13A:
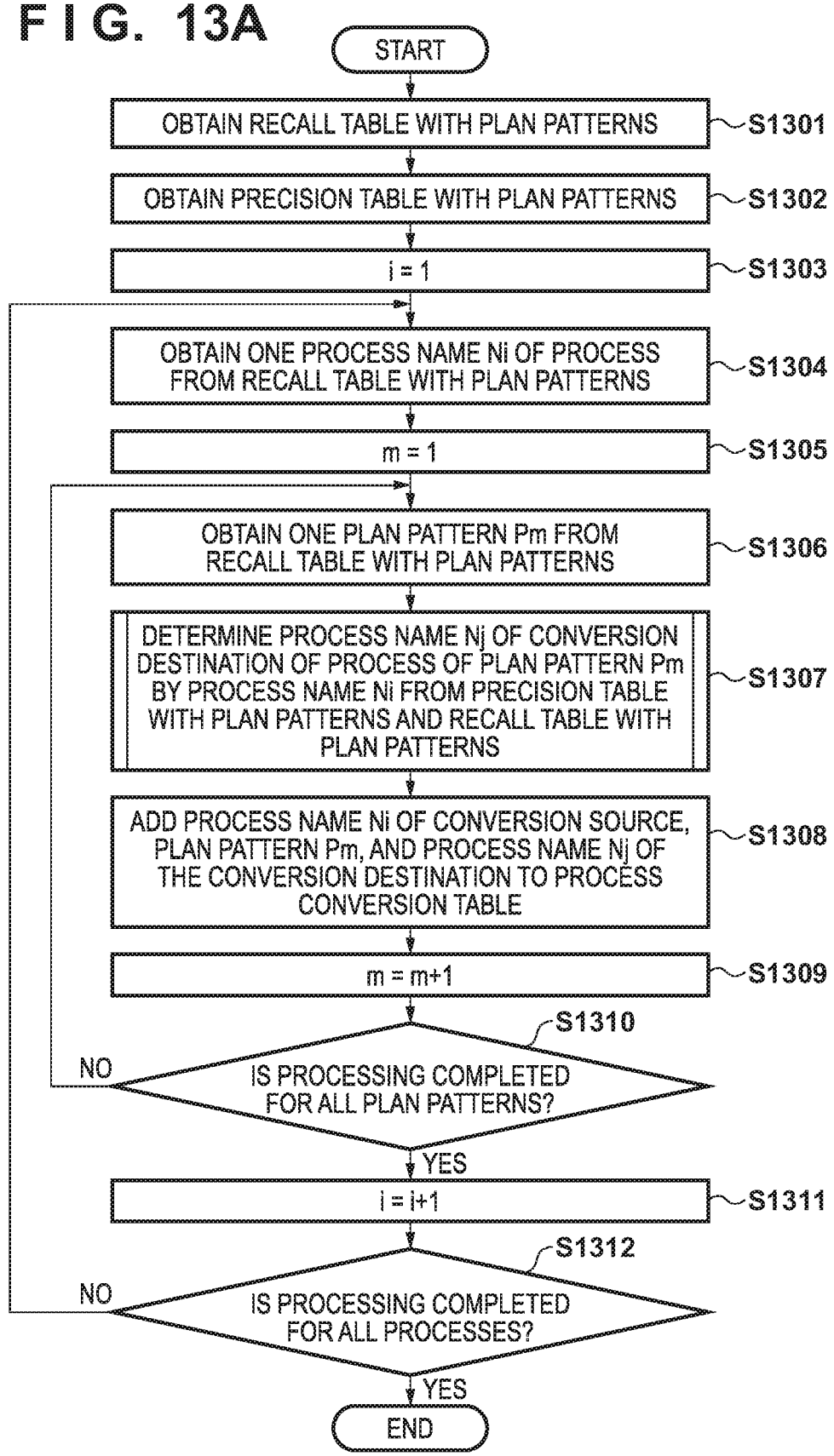

FIG. 13A is a flowchart for explaining the operation of the process conversion table creation unit.

In step S1301, the process conversion table creation unit 1003 obtains a recall table 1202 with plan patterns. In step S1302, the process conversion table creation unit 1003 obtains a precision table 1203 with plan patterns.

In step S1303, the process conversion table creation unit 1003 initializes a counter i to 1. In step S1304, the process conversion table creation unit 1003 obtains one process name Ni of a process from the recall table 1202 with plan patterns.

In step S1305, the process conversion table creation unit 1003 initializes a counter m to 1. In step S1306, the process conversion table creation unit 1003 obtains one plan pattern Pm from the recall table 1202 with plan patterns.

In step S1307, the process conversion table creation unit 1003 determines a process name Nj of the conversion destination of the process of the plan pattern Pm by the process name Ni from the recall table 1202 with plan patterns and the precision table 1203 with plan patterns. Details of the processing of step S1307 will be described later with reference to FIG. 14. In step S1308, the process conversion table creation unit 1003 adds the process name Ni of the conversion source, the plan pattern Pm, and the process name Nj of the conversion destination to the process conversion table.

FIG. 13B shows a process conversion table 1300 in which each record represents a process conversion rule. The process conversion table 1300 is formed by "process conversion ID", "conversion source", "plan pattern", and "conversion destination" fields. In the "process conversion ID" field, an ID used to identify each process conversion rule is recorded. In the "conversion source" field, the process name of the conversion source is recorded. In the "plan pattern" field, the plan pattern ID of a plan pattern linked with the process of the conversion source is recorded. In the "conversion destination" field, the process name of the destination of conversion of the process of the conversion source in the plan pattern is recorded.

In step S1309, the process conversion table creation unit 1003 adds 1 to the counter m. In step S1310, the process conversion table creation unit 1003 judges whether the processing is completed for all plan patterns. If the processing is completed, the processing advances to step S1311. If the processing is not completed, the processing returns to step S1306.

In step S1311, the process conversion table creation unit 1003 adds 1 to the counter i. In step S1312, the process conversion table creation unit 1003 judges whether the processing is completed for all processes. If the processing is completed, the processing in the process conversion table creation unit 1003 is ended. If the processing is not completed, the processing returns to step S1304.

<Procedure of Processing in Process Conversion Judging Unit>

Figure 14:
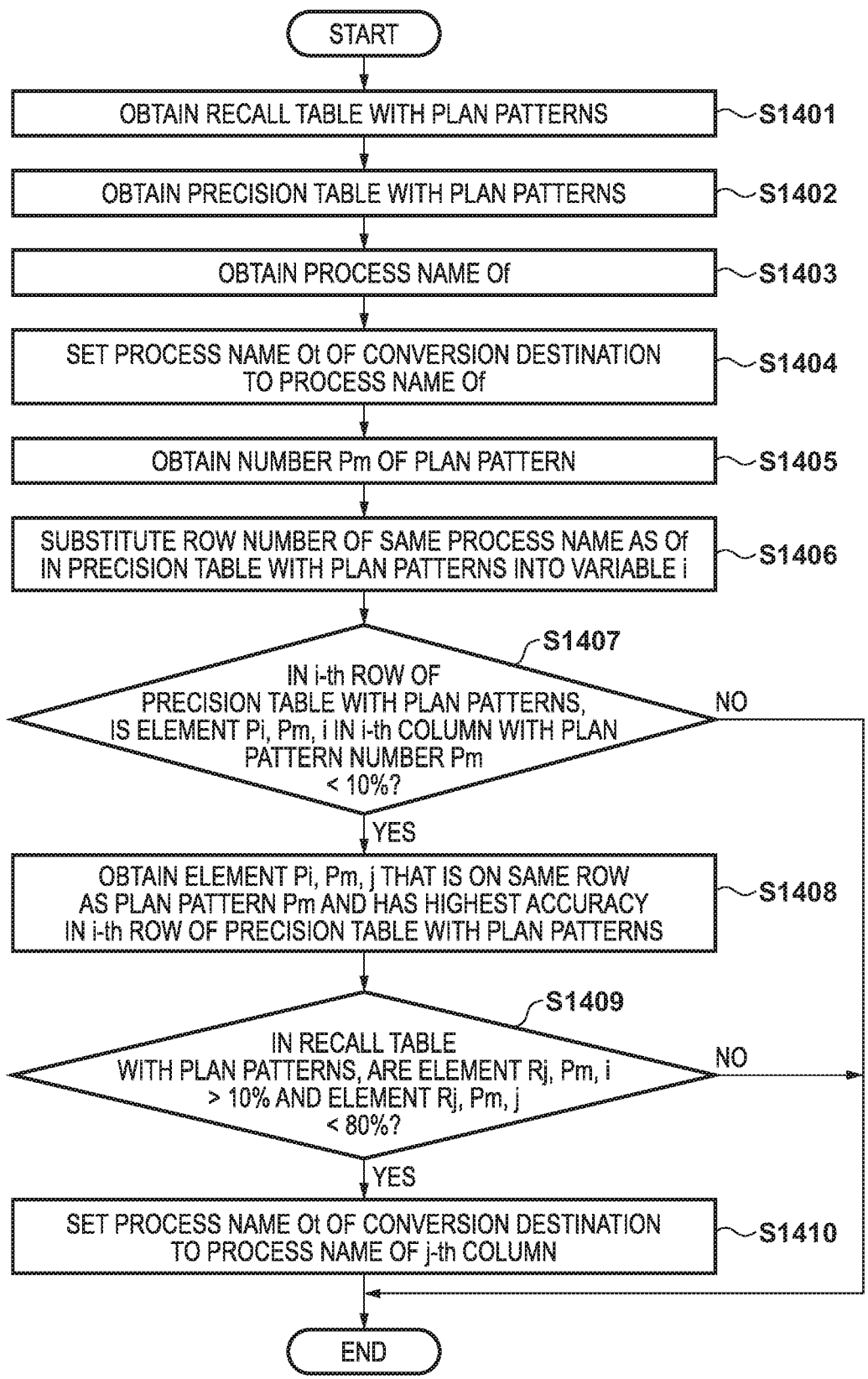
FIG. 14 is a flowchart for explaining the operation of a process conversion judging unit.

FIG. 14 is a flowchart for explaining the operation of the process conversion judging unit 1004. That is, this is processing of the process conversion judging unit 1004 invoked in step S1307.

In step S1401, the process conversion judging unit 1004 obtains the recall table 1202 with plan patterns. In step S1402, the process conversion judging unit 1004 obtains the precision table 1203 with plan patterns.

In step S1403, the process conversion judging unit 1004 obtains a process name Of Note that the process name Of is the same value as a process name Ni in step S1307 described above. In step S1404, the process conversion judging unit 1004 sets a process name Ot of the conversion destination to the process name Of This is processing for maintaining the process of the conversion source when it is judged that it is appropriate not to convert.

In step S1405, the process conversion judging unit 1004 obtains a number Pm of a plan pattern. Note that the number Pm of the plan pattern is the same value as the number Pm of the plan pattern in step S1307 described above. In step S1406, the process conversion judging unit 1004 substitutes the row number of the same process name as Of in the precision table 1203 with plan patterns into a variable i. In step S1407, the process conversion judging unit 1004 judges whether an element $P_{i,Pm,i}$ in the ith column with the plan pattern number Pm is smaller than 10% in the ith row of the precision table 1203 with plan patterns. If the element is smaller, the estimation accuracy of the process of the ith row is low. It is therefore judged that it is a conversion candidate, and the processing advances to step S1408. Otherwise, it cannot be said that the estimation accuracy is low. It is therefore judged that it is appropriate not to convert, and the processing of the process conversion judging unit 1004 is ended.

In step S1408, the process conversion judging unit 1004 obtains an element $P_{i,Pm,j}$ that is on the same row as the plan pattern Pm and has the highest accuracy in the ith row of the precision table 1203 with plan patterns. This is processing for specifying which process is actually being performed at a high possibility when the ith row process is estimated.

In step S1409, the process conversion judging unit 1004 judges whether an element $R_{j,Pm,i}$ is larger than 10%, and an element $R_{j,Pm,j}$ is smaller than 80% in the recall table 1202 with plan patterns. In a case in which the conditions are satisfied, if the plan pattern is the plan pattern Pm, when the process is estimated as a process in the ith row of the precision table 1203 with plan patterns, a process in the jth column of the precision table 1203 with plan patterns is actually being performed at a high possibility. Hence, it is judged to convert the process in the ith row into the process in the jth column, and the processing advances to step S1410. On the other hand, if the conditions are not satisfied, it is judged that the possibility that the process in the jth column is the process of the conversion destination is not high, and the processing of the process conversion judging unit 1004 is ended.

In step S1410, the process conversion judging unit 1004 sets the process name Ot of the conversion destination to the process name of the jth column of the precision table 1203 with plan patterns.

<Procedure of Processing in Correction Unit>

Figure 15:
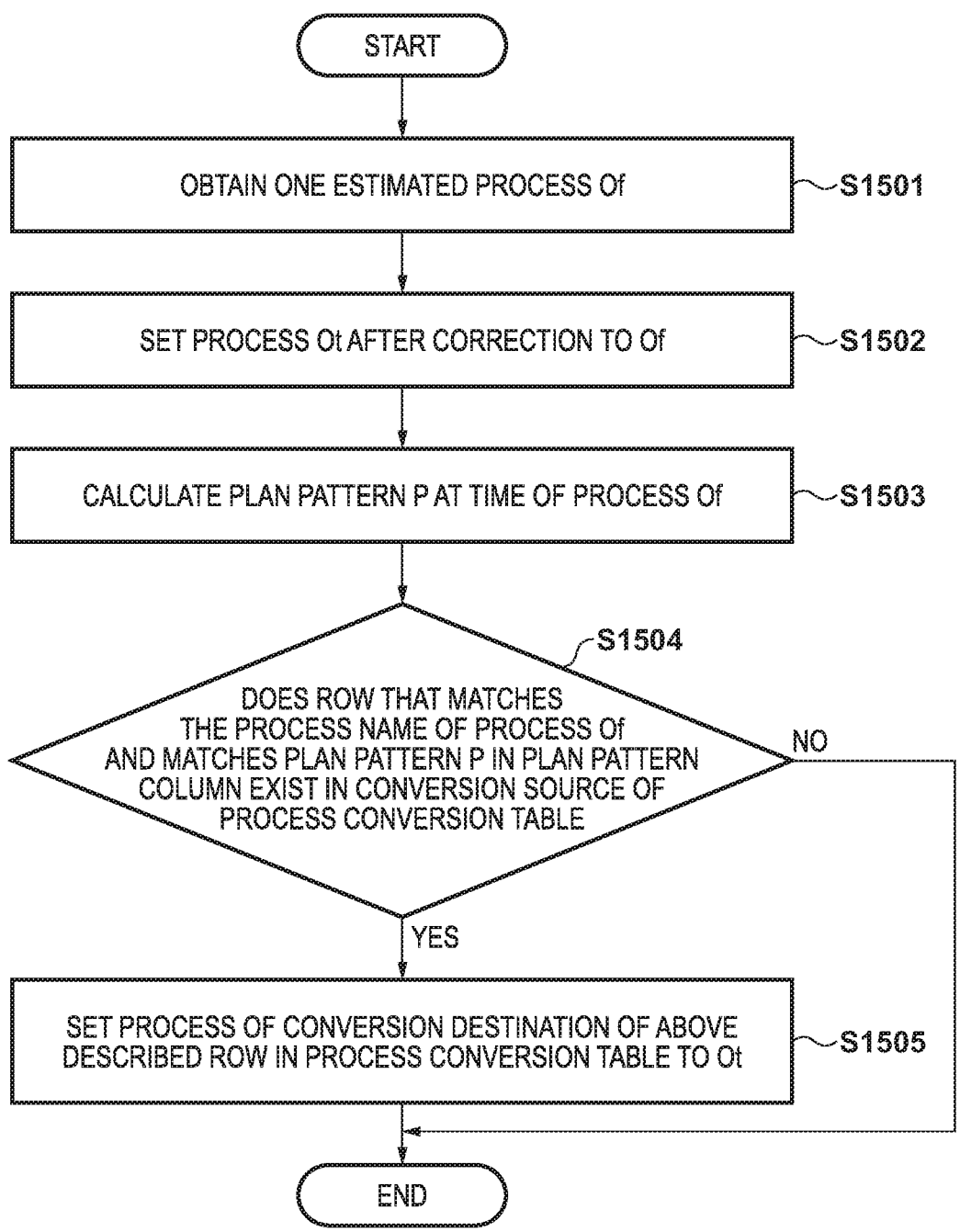
FIG. 15 is a flowchart for explaining the operation of a correction unit.

FIG. 15 is a flowchart for explaining the operation of the correction unit.

In step S1501, the correction unit 1005 obtains one estimated process Of. In step S1502, the correction unit 1005 sets the process Ot after correction to Of. In step S1503, the correction unit 1005 calculates a plan pattern P at the time of the process Of Based on the feature ID of, a time linked with the feature ID in the feature data table is obtained. By referring to the start time and the end time of the plan result table from that time, a plan planned at that time is specified. Furthermore, by referring to the plan pattern table based on the preceding and succeeding processes that are planned, the plan pattern at that time is specified.

In step S1504, the correction unit 1005 judges whether a row that matches the process name of the process Of and matches the plan pattern P in the plan pattern column exists in the conversion source of the process conversion table. If the row exists, to convert the process, the processing advances to step S1505. If the row does not exist, the process is not converted. Hence, the processing of the correction unit 1005 is ended. In step S1505, the correction unit 1005 sets the process of the conversion destination of the row in the process conversion table to Ot.

FIGS. 16A and 16B are views exemplarily showing various kinds of data obtained in correction processing. FIG. 16A shows an example of a recall table 1600 with plan patterns in which a column represents an actual process, and a row represents an estimated process.

FIG. 16B shows an example of a precision table 1601 with plan patterns in which each row (record) represents an actual process to an estimated process for each plan pattern. If an estimation result is "creasing" in plan pattern 1, the following processing is performed. First, a record in which the estimation result is "creasing", and the plan pattern is "1" is specified in the precision table with plan patterns. To judge whether the process is correctly estimated as "creasing" in this record, the column of "creasing" as the actual process is checked. Then, the estimation accuracy is as low as "0.4% (reference numeral 1602)". It is checked which process has a high possibility when the process is estimated as "creasing". Then, the possibility of "printing" is as high as "44.6% (reference numeral 1603)". To confirm whether the "printing" process is often actually estimated as "creasing", the column of "creasing" is referred to in plan pattern 1 of the row of "printing" in the recall table 1600 with plan patterns. Then, an estimation error occurs at a high probability of "39.7% (reference numeral 1605)". For this reason, if a process is estimated as "creasing" for plan pattern 1, the possibility that the "printing" process is actually being performed is high. Hence, the estimation result is converted into "printing".

Figure 16C:
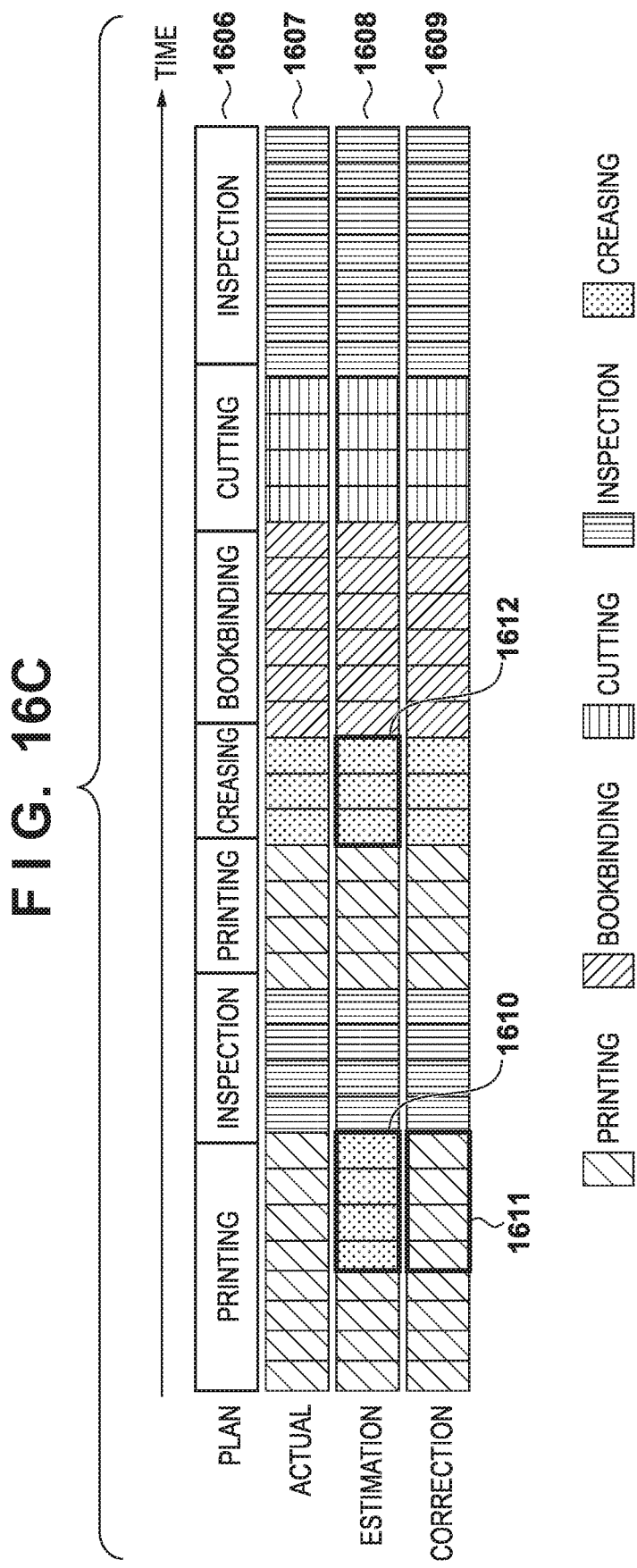

FIG. 16C shows an example of a correction result obtained by the above-described processing. A time series 1606 represents a plan result. A time series 1607 represents the time series of actual processes at times. A time series 1608 represents the time series of the processes of estimation results at times. A bold frame 1610 in the time series 1608 indicates a portion where the estimation is wrong.

Here, a process that is actually "printing" is erroneously estimated as "creasing". A time series 1609 represents the time series of the processes of correction results at times. A bold frame 1611 in the time series 1609 indicates a portion corrected by the correction unit 1005. Here, the result of properly correcting a process to "printing" by the above-described processing is exemplarily shown.

Next, if an estimation result is creasing in plan pattern 2, the element 1605 that is the element of interest (that is, the estimation result is "creasing", the plan pattern is "2", and the actual process is "creasing") in the precision table 1601 with plan patterns is checked. Then, the estimation accuracy is as high as "90.0%". That is, it can be decided that the possibility that the process can correctly be estimated is high. Hence, the conversion of the process is not performed. In the time series 1608, a bold frame 1612 represents the estimation result of plan pattern 2. As indicated by the time series 1609, the estimation result is not corrected in the portion corresponding to the bold frame 1612 in the time series 1608.

As described above, according to the second embodiment, an estimation result is corrected based on an estimation accuracy for each plan pattern, thereby obtaining a more accurate estimation result.

Third Embodiment

In the third embodiment, a method of raising the accuracy of correction by considering a variation (variance) of a work time of each process and a plan result will be described.

<Apparatus Arrangement>

Figure 17:
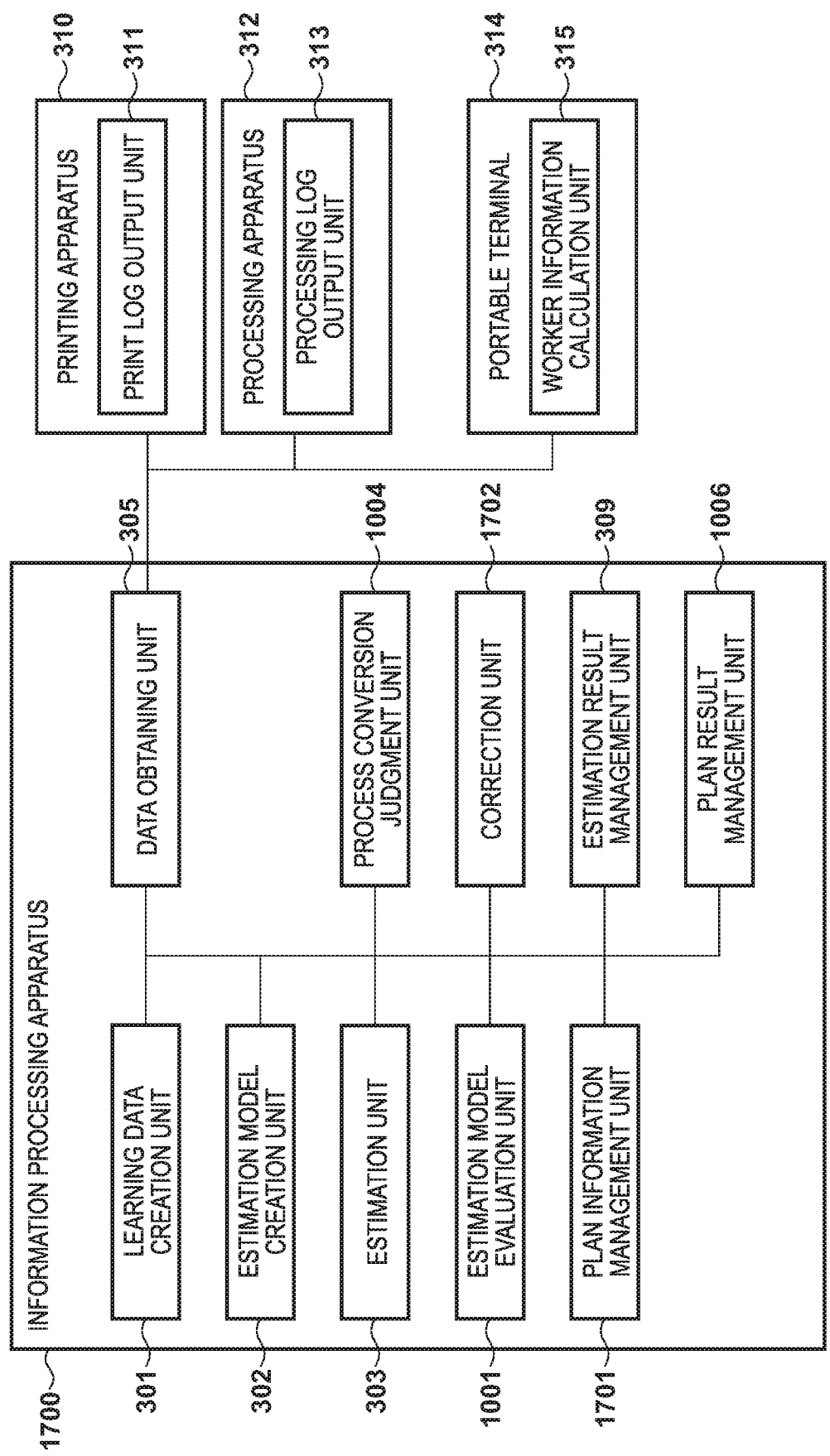
FIG. 17 is a view showing an example of the functional arrangement of an information processing apparatus according to the third embodiment.

FIG. 17 is a view showing an example of the functional arrangement of an information processing apparatus according to the third embodiment. Note that the hardware arrangement is similar to the first and second embodiments, and a description thereof will be omitted. Note that the same reference numerals as in the first and second embodiments denote constituent elements of the same functions in the following explanation, and a description will be omitted.

A plan information management unit 1701 manages plan information. The plan information management unit 1701 also manages the variance of a work time. A correction unit 1702 corrects an estimation result in consideration of the variance as well.

<Procedure of Processing in Correction Unit>

Figure 18A:
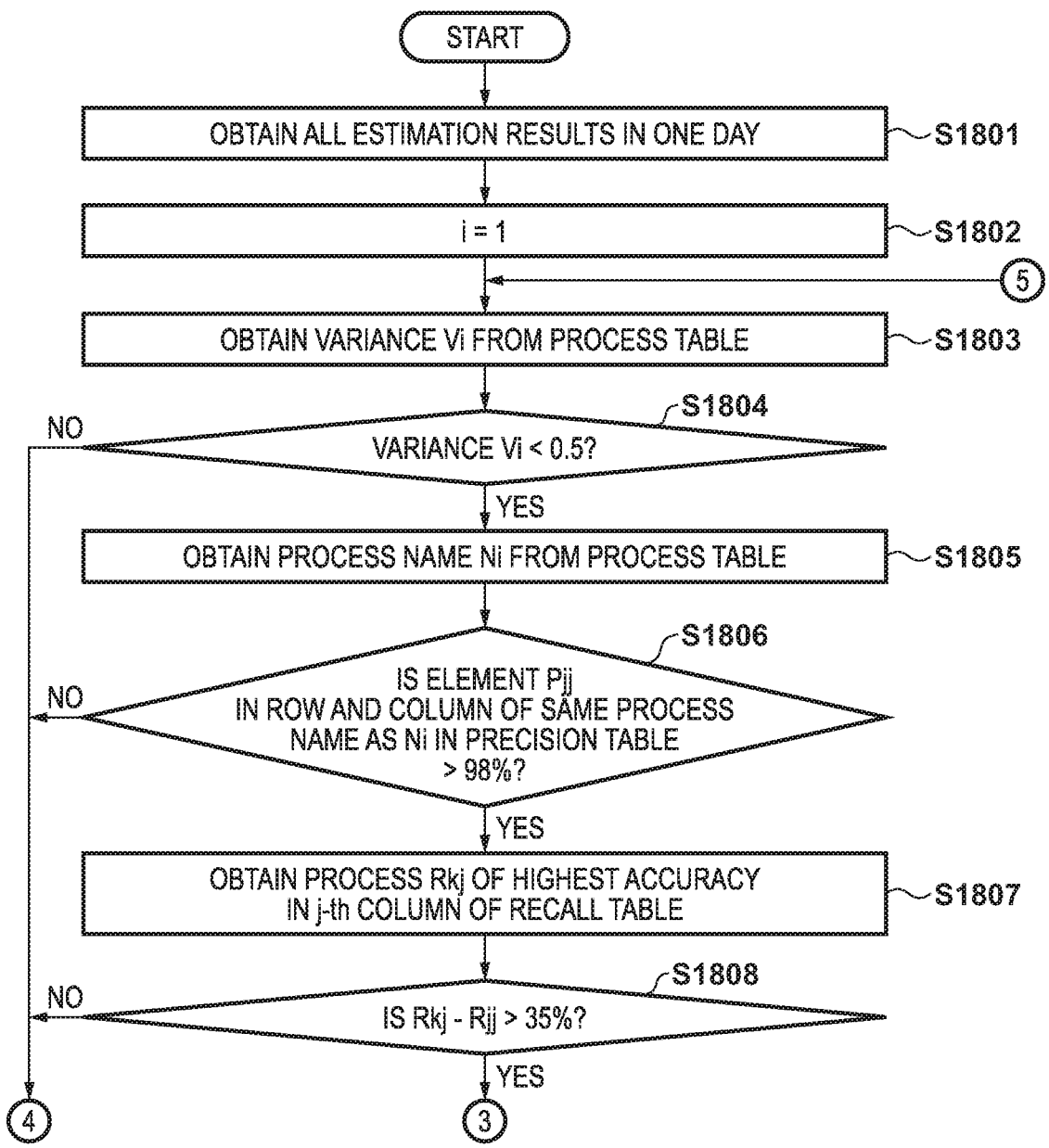
FIGS. 18A and 18B are flowcharts for explaining the operations of a correction unit.
Figure 18B:
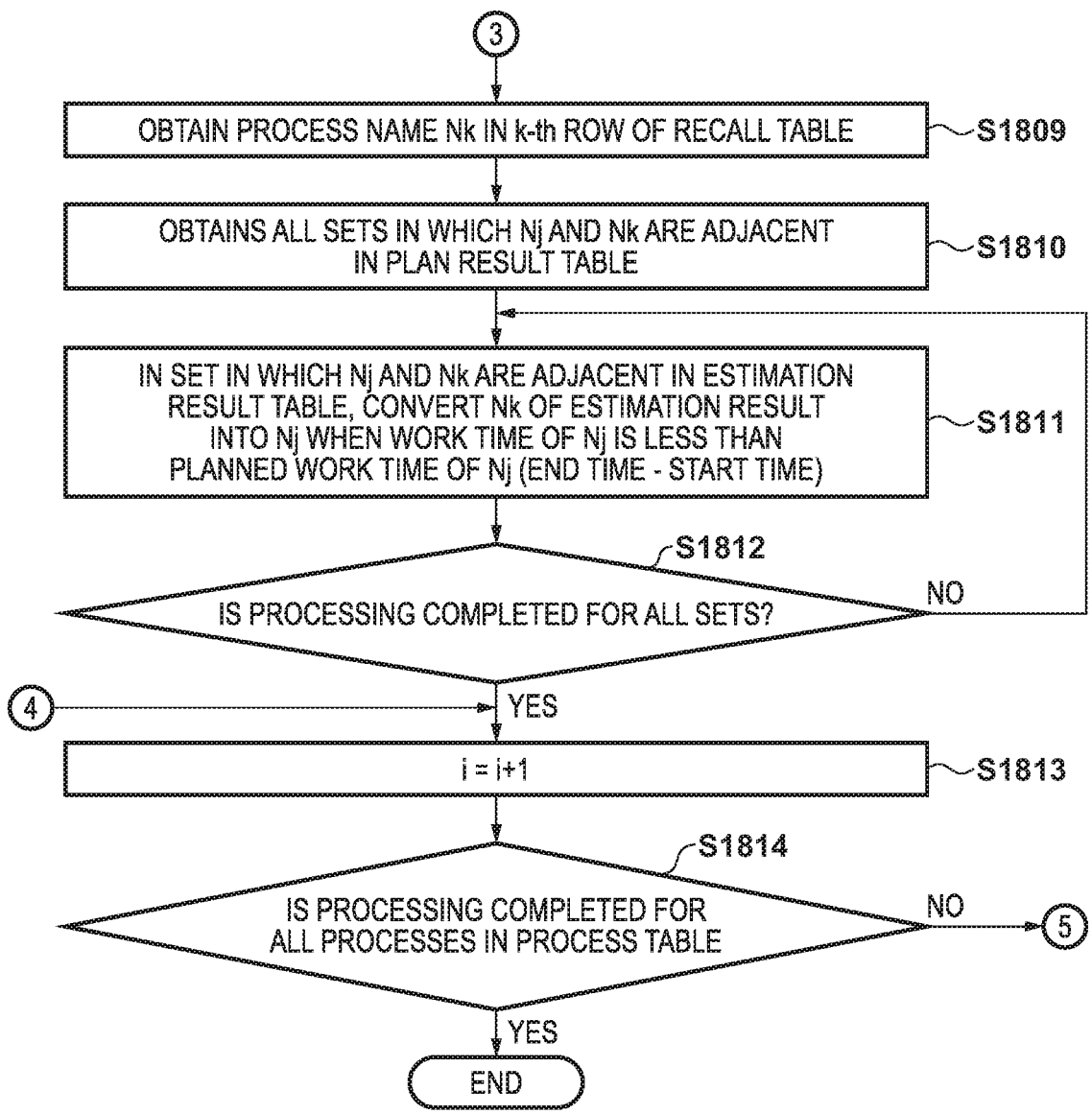

FIGS. 18A and 18B are a flowchart for explaining the operation of the correction unit 1702.

In step S1801, the correction unit 1702 obtains all estimation results in one day. In step S1802, the correction unit 1702 initializes a counter i to 1. In step S1803, the correction unit 1702 obtains a variance Vi from a process table. Here, the variance Vi is a value shown in the "variance" field of a process table 1900 to be described later.

In step S1804, the correction unit 1702 judges whether the variance Vi is smaller than 0.5 (second threshold). If the variance Vi is smaller, it is judged that the work time has a small variation, and the processing advances to step S1805. Otherwise, the processing advances to step S1813 to confirm the next process.

In step S1805, the correction unit 1702 obtains a process name Ni from the process table 1900. In step S1806, the correction unit 1702 judges whether an element Pjj in a row and a column of the same process name as Ni in the precision table is larger than 98%. If the element is larger, it is regarded as the candidate of conversion target, and the processing advances to step S1807. Otherwise, the processing advances to step S1813 to check the next process in the process table 1900.

In step S1807, the correction unit 1702 obtains a process Rkj of the highest accuracy in the jth column of the recall table. In step S1808, the correction unit 1702 judges whether (Rkj−Rjj) is larger than 35%. If (Rkj−Rjj) is larger, the possibility that even if a process in the ith row of the recall table is actually being performed, the process is erroneously estimated as a process in the jth row of the recall table is high. Hence, the process in the jth row is regarded as the candidate of the conversion target, and the processing advances to step S1809. Otherwise, the process in the jth row is regarded as a non-candidate of the conversion target, and the processing advances to step S1813 to check the next process in the process table.

In step S1809, the correction unit 1702 obtains a process name Nk in the kth row of the precision table. In step S1810, the correction unit 1702 obtains all sets in which Nj and Nk are adjacent in the plan result table. In step S1811, in a set in which Nj and Nk are adjacent in the estimation result table, the correction unit 1702 converts Nk of the estimation result into Nj when the work time of Nj is less than the planned work time of Nj (end time−start time).

In step S1812, the correction unit 1702 judges whether the processing is completed for all sets. If the processing is completed for all sets, the processing advances to step S1813. If the processing is not completed, the processing returns to step S1811. In step S1813, the correction unit 1702 adds 1 to the counter i. In step S1814, the correction unit 1702 judges whether the processing is completed for all processes in the process table. If the processing is completed for all processes, the processing of the correction unit 1702 is ended. If the processing is not completed, the processing returns to step S1803.

FIGS. 19A to 19C are views exemplarily showing various kinds of data obtained in correction processing. FIG. 19A shows an example of the process table 1900. A "variance" field is further added to a process table 901 (FIG. 9B) according to the second embodiment. In the "variance" field, a value representing the variation of the work time in each process is recorded.

FIG. 19B shows an example of a recall table 1901. Each row represents the process of an estimation result, and each column represents an actual process. It is apparent from the recall table 1901 that the ratio of actual processes "bookbinding" that are correctly estimated as "bookbinding" is 30%, and the ratio of actual processes that are erroneously estimated as "cutting" is 70%.

FIG. 19C shows an example of a precision table 1902. Each row represents an actual process, and each column represents the process of an estimation result. It is apparent from the precision table 1902 that the probability that a process estimated as "bookbinding" is actually the "bookbinding" processing is as high as 99%.

FIG. 19D shows an example of a correction result obtained by the above-described processing. A time series 1903 represents a plan result. Here, "printing", "bookbinding", and "cutting" processes are planned. A time series 1904 represents an estimation result at each time interval $\Delta t$. "Printing" is estimated as $5\Delta t$, "bookbinding" is estimated as $6\Delta t$, and "cutting" is estimated as $104t$. A time series 1905 represents a correction result. By the above-described processing, "cutting" corresponding to 44 in the time series 1904 is converted into "bookbinding", "printing" is corrected to $5\Delta t$, "bookbinding" is corrected to $10\Delta t$, and "cutting" is corrected to $6\Delta t$.

Details of the conversion processing are as follows. First, one record is obtained from the process table 1900, and it is judged whether the variation of the work time of a process of the record is small (that is, whether the variance is small). For example, since the variance is large for OP003, the next OP004 is checked. Since the variance of OP004 is small, the precision of bookbinding of the process name of OP004 is checked. Since the precision is high, the recall is checked next. Then, when "bookbinding" is actually being performed, it is erroneously estimated as "cutting". That is, it can be said that if a process is estimated as "cutting", the "bookbinding" process is included actually at a high possibility. For example, if the time of "bookbinding" is 10 min in the plan but is estimated as 8 min, and the estimation result of "cutting" is longer than in the plan, 2 min in the estimation result of "cutting" includes the time of "bookbinding" at a high possibility. Hence, the time estimated as the time of "cutting" is converted into bookbinding. The processing is similarly performed for other processes in the process table.

As described above, according to the third embodiment, when the variation (variance) of the work time of each process and the plan result are taken into consideration, the accuracy of correction can be raised.

<Modifications>

In the first embodiment, the process conversion judging unit 307 obtains two elements of high accuracies. However, the process conversion judging unit 307 may obtain three or more elements of high accuracies. In this case, the precisions and recalls are compared between the candidates of conversion destination processes, and a conversion destination process of the highest possibility is specified. That is, it is necessary to only obtain one or more elements having relatively high accuracy in a plurality of elements.

In the plan pattern table according to the second embodiment, process names are stored in the fields of "process 1", "process 2", . . . . However, the present invention is not limited to this. For example, process IDs may be stored. When the process IDs are stored, merchandise can be specified by referring to the process ID field of the merchandise table 900. It is therefore possible to cope with a case in which the estimation accuracy varies depending on merchandise, for example, a case in which the estimation accuracy is high when manufacturing booklet merchandise, and low when manufacturing leaflet merchandise.

In the plan pattern table according to the second embodiment, the plan pattern table 800 shown in FIG. 8B is used. However, the present invention is not limited to this. For example, a medium plan pattern table 801 shown in FIG. 8C may further be used. The medium plan pattern table 801 is a plan pattern table that puts a plurality of plan patterns together and consider a longer period. In the case of the plan pattern table 800, if the work result is greatly deviated from the plan, the plan pattern at a certain point of time may erroneously be specified. To prevent this, a group of a string of processes of a longer period is defined and referred to, thereby accuracy specifying a plan pattern at a certain point of time. Note that in the medium plan pattern table 801, each record represents a medium plan pattern, and the medium plan pattern is an ID used to identify each medium plan pattern. Plan pattern IDs are stored in fields of "plan pattern ID 1", "plan pattern ID 2", . . . . As described above, a medium plan pattern may be specified in the medium plan pattern table 801, and after that, a plan pattern may be specified in the plan pattern table 800.

Additionally, in the process conversion judging unit 1004 according to the second embodiment, the element of the highest accuracy is obtained. However, the present invention is not limited to this, and two or more elements of high accuracies may be obtained. In this case, an arrangement configured to branch the processing and specify the process of the conversion destination of the highest possibility is used.

Furthermore, in the above-described embodiments, a plan pattern is specified by referring to the string of preceding and succeeding processes. However, the present invention is not limited to this, and a plan pattern may be specified from the length of the time of a process before a self-process, the length of the time of a self-process, the ratio of the times, or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-243787, filed Dec. 26, 2018, which is hereby incorporated by reference herein in its entirety.

What is claimed is:

1. An information processing apparatus comprising:
at least one processor configured to read out and execute instructions stored in at least one memory to thereby cause the information processing apparatus to function as:
an obtaining unit configured to obtain (i) feature data of workers' activities at a production site and (ii) past result information from the production site;
an estimation model generating unit configured to generate an estimation model using machine learning, the machine learning being based on training data that includes (i) the obtained past result information from the production site and (ii) correct answer data indicating correct answers at time intervals;

an estimation unit configured to generate an estimation result that is an estimate of a work process from the feature data using the estimation model;

a determination unit configured to determine a conversion table based on two types of estimation accuracy in the estimation model, with the conversion table being used to correct the estimation result obtained by using the estimation model; and a correction unit configured to correct the estimation result based on the conversion table, wherein the estimation accuracy is determined using (i) a recall value that is a ratio of each work process estimated by the estimation model in each actual work process in the past result information obtained by the obtaining unit, and (ii) a precision value that is a ratio of each actual work process in each work process estimated by the estimation model in the past result information obtained by the obtaining unit.

2. The apparatus according to claim 1, wherein concerning a first work process for which the precision value is lower than a first threshold, based on the recall value of a second work process for which a probability that a process that is actually the first work process but is estimated as the second work process, the determination unit determines to correct the first work process to the second work process.

3. The apparatus according to claim 1, wherein the obtaining unit comprises a result information obtaining unit configured to obtain given result information.

4. The apparatus according to claim 3, wherein each of the past result information and the given result information is information concerning a production activity executed in a work space in which a plurality of pieces of equipment configured to execute a plurality of work processes are arranged, and wherein each result information includes information of a position of a worker in the work space at each time.

5. The apparatus according to claim 3, wherein the given result information is information concerning a production activity executed based on a given production plan, wherein the given production plan is set as a pattern combination constituted as a combination of a plurality of plan patterns each including a plurality of work processes, and wherein the determination unit determines the conversion table based on each of the plurality of plan patterns.

6. The apparatus according to claim 1, wherein the past result information includes information of a work time of each of a plurality of work processes included in a production plan corresponding to the past result information and a variation of the work time, and wherein the correction unit performs correction based on the conversion table for a work process for which the variation of the work time is smaller than a second threshold in the work processes included in the estimation result.

7. An information processing apparatus comprising:

at least one processor configured to read out and execute instructions stored in at least one memory to thereby cause the information processing apparatus to function as:

a learned model generating unit configured to generate a learned model using machine learning, the machine learning being based on training data that includes (i) the obtained past result information from a production site and (ii) correct answer data indicating correct answers at time intervals:

an obtaining unit configured to, using the learned model, obtain a work process in a unit time output by the learned model in response to input of new result information;

an evaluation unit configured to evaluate matching between a work process in a unit time obtained by the obtaining unit in response to input of first result information and a work process actually performed in the unit time;

a determination unit configured to determine a conversion table, with the conversion table being used to covert a first work process in the unit time, which is evaluated by the evaluation unit to be lower than a predetermined criterion in a plurality of work processes obtained by the obtaining unit in response to the input of the first result information, to a second work process actually performed in the unit time; and a correction unit configured to correct, using the conversion table, part of a work process obtained by the obtaining unit in response to input of second result information, wherein the evaluation unit uses (i) a recall value that is a ratio of each work process output by the learned model in each actual work process in the past result information, and (ii) a precision value that is a ratio of each actual work process in each work process output by the learned model in the past result information.

8. The apparatus according to claim 7, wherein the result information is information concerning a production activity executed based on a given production plan, wherein the given production plan is set as a pattern combination constituted as a combination of a plurality of plan patterns each including a plurality of work processes, and wherein the determination unit determines the conversion table based on each of the plurality of plan patterns.

9. The apparatus according to claim 7, wherein the past result information is information concerning a production activity executed in a work space in which a plurality of pieces of equipment configured to execute a plurality of work processes are arranged, and wherein each result information includes information of a position of a worker in the work space at each time.

10. A method of controlling an information processing apparatus configured to correct an estimation result estimated using an estimation model, the method comprising:

obtaining feature data of workers' activities at a production site and past result information from the production site;

generating the estimation model using machine learning, the machine learning being based on training data that includes (i) the obtained past result information from the production site and (ii) correct answer data indicating correct answers at time intervals;

estimate an estimation result that is an estimate of a work process from the feature data using the estimation model;

determining a conversion table based on two types of estimation accuracy in the estimation model, with the conversion table being used to correct the estimation result obtained by using the estimation model; and correcting the estimation result based on the conversion table,
wherein the estimation accuracy is determined using (i) a recall value that is a ratio of each work process estimated by the estimation model in each actual work process in the past result information, and (ii) a precision value that is a ratio of each actual work process in each work process estimated by the estimation model in the past result information.

11. The method according to claim 10, wherein in the determining, concerning a first work process for which the second index value is lower than a first threshold, based on the first index value of a second work process for which a probability that a process that is actually the first work process but is estimated as the second work process, it is determined to correct the first work process to the second work process.

12. The method according to claim 10, wherein the obtaining comprises:
obtaining given result information; and
deriving the estimation result based on the estimation model and the result information obtained in the obtaining the given result information.

13. The method according to claim 12, wherein each of the past result information and the given result information is information concerning a production activity executed in a work space in which a plurality of pieces of equipment configured to execute a plurality of work processes are arranged, and
wherein each result information includes information of a position of a worker in the work space at each time.

14. The method according to claim 10, wherein the past result information includes information of a work time of each of a plurality of work processes included in a production plan corresponding to the past result information and a variation of the work time, and
wherein in the correcting, correction is performed based on the conversion table for a work process for which the variation of the work time is smaller than a second threshold in the work processes included in the estimation result.

15. A non-transitory computer-readable recording medium storing a program that causes a computer to function as an information processing apparatus comprising:
an obtaining unit configured to obtain (i) feature data of workers' activities at a production site and (ii) past result information from the production site;
an estimation model generating unit configured to generate an estimation model using machine learning, the machine learning being based on training data that includes (i) the obtained past result information from the production site and (ii) correct answer data indicating correct answers at time intervals;
an estimation unit configured to generate an estimation result that is an estimate of a work process from the feature data using the estimation model;
a determination unit configured to determine a conversion table based on two types of estimation accuracy in the estimation model; and
a correction unit configured to correct the estimation result based on the conversion table,
wherein the estimation accuracy is determined using (i) a recall value that is a ratio of each work process estimated by the estimation model in each actual work process in the past result information obtained by the obtaining unit, and (ii) a precision value that is a ratio of each actual work process in each work process estimated by the estimation model in the past result information obtained by the obtaining unit.

* * * * *